US 7,736,735 B2

(12) United States Patent
Kanamori et al.

(10) Patent No.: US 7,736,735 B2
(45) Date of Patent: Jun. 15, 2010

(54) COATING COMPOSITION, UNDERCOATING COMPOSITION, MULTILAYER BODY HAVING COATING FILM MADE OF SUCH COMPOSITION, PHOTOCATALYST COATING FILM, AND MOLDED BODY

(75) Inventors: Tarou Kanamori, Chuo-ku (JP); Keisuke Yajima, Chuo-ku (JP); Akira Nishikawa, Chuo-ku (JP)

(73) Assignee: JSR Corporation, Tokyo (JP)

( * ) Notice: Subject to any disclaimer, the term of this patent is extended or adjusted under 35 U.S.C. 154(b) by 483 days.

(21) Appl. No.: 11/661,359

(22) PCT Filed: Sep. 2, 2005

(86) PCT No.: PCT/JP2005/016150

§ 371 (c)(1),
(2), (4) Date: Feb. 28, 2007

(87) PCT Pub. No.: WO2006/025535

PCT Pub. Date: Mar. 9, 2006

(65) Prior Publication Data

US 2007/0269653 A1    Nov. 22, 2007

(30) Foreign Application Priority Data

Sep. 3, 2004 (JP) .............................. 2004-257604

(51) Int. Cl.
*B32B 27/00*  (2006.01)
*C09D 183/04*  (2006.01)
*C09D 5/00*  (2006.01)
*C09D 7/12*  (2006.01)
*C09D 183/02*  (2006.01)
*B01J 35/02*  (2006.01)

(52) U.S. Cl. ............. 428/337; 106/287.12; 106/287.13; 106/287.14; 106/287.16; 428/447; 528/34; 528/39

(58) Field of Classification Search ............ 106/287.12, 106/287.13, 287.14, 287.16; 528/34, 39; 428/337, 447
See application file for complete search history.

(56) References Cited

U.S. PATENT DOCUMENTS

2002/0007006 A1 * 1/2002 Kanamori et al. ........... 524/588

FOREIGN PATENT DOCUMENTS

| JP | 64-69673 | 3/1989 |
| JP | 64-69674 | 3/1989 |
| JP | 4-108172 | 4/1992 |
| JP | 4-117473 | 4/1992 |
| JP | 8-164334 | 6/1996 |
| JP | 8-176527 | 7/1996 |
| JP | 8-259891 | 10/1996 |
| JP | 2000 063750 | 2/2000 |
| JP | 2000 239563 | 9/2000 |
| JP | 2001 279184 | 10/2001 |
| JP | 2001 354902 | 12/2001 |
| JP | 2003 313497 | 11/2003 |
| JP | 2003 313498 | 11/2003 |
| JP | 2005 113029 | 4/2005 |
| JP | 2005 113062 | 4/2005 |

* cited by examiner

*Primary Examiner*—D. S Nakarani
(74) *Attorney, Agent, or Firm*—Oblon, Spivak, McClelland, Maier & Neustadt, L.L.P.

(57) ABSTRACT

The coating composition of the present invention contains an organic-inorganic hybrid polymer and a polysiloxane having a specific molecular weight, wherein the organic-inorganic hybrid polymer is prepared from a specific silane compound and a specific silyl group-containing polymer, and the weight ratio (Wa/Wb) between the silane compound content (Wa) and the silyl group-containing polymer content (Wb) is within the range from 5/95 to 50/50 (provided that Wa+Wb=100). The coating composition enables to obtain a coating film excellent in transparency, adhesion to organic substrates and radical resistance, and the coating composition has excellent storage stability.

17 Claims, No Drawings

COATING COMPOSITION, UNDERCOATING COMPOSITION, MULTILAYER BODY HAVING COATING FILM MADE OF SUCH COMPOSITION, PHOTOCATALYST COATING FILM, AND MOLDED BODY

CROSS REFERENCE TO RELATED APPLICATION

This application is a 371 of PCT/JP05/016150, filed on Sep. 2, 2005, and claims priority to Japanese Patent Application No. JP 2004-257604, filed on Sep. 3, 2004.

TECHNICAL FIELD

The present invention relates to a coating composition and use thereof. More particularly, the present invention relates to a coating composition that provides coating films excellent in adhesion to organic substrates. It also relates to a coating composition suitable as an undercoating composition for a photocatalytic layer in a layered product having the photocatalytic layer, wherein the undercoating composition provides a coating film capable of preventing the degradation of an organic substrate due to the photocatalytic action and has high hardness, excellent weatherability, and excellent sustainable adhesion. Moreover, the present invention relates to a layered product having a coating film formed from the coating composition, a photocatalytic coating film, and a molded product.

BACKGROUND ART

There have been recently demanded coating compositions capable of forming coating films having high hardness as well as excellent in weatherability, contamination resistance, and chemical resistance. Hereinafter, high versatility will be also demanded for coating compositions. As such coating compositions, compositions comprising a silyl group-containing vinylic resin and an organosilane compound were proposed in Patent Document 1 (Japanese Patent Laid-open Publication No. H01-69673), Patent Document 2 (Japanese Patent Laid-open Publication No. H01-69674), Patent Document 3 (Japanese Patent Laid-open Publication No. H04-108172), and Patent Document 4 (Japanese Patent Laid-open Publication No. H04-117473). Further improvement is, however, demanded for these coating compositions in terms of adhesion to organic substrates.

There have been recently proposed numerous coating compositions in which a photocatalyst component is blended. Such a photocatalyst-containing coating composition is applied to surfaces of various substrates to form a photocatalytic layer, and its photocatalytic action makes the surface of coating film hydrophilic, whereby the contamination resistance of the substrate (a layered product) is improved. However, for substrates made of organic material such as resin, there has been a problem that the organic material that is a substrate is decomposed by radicals generated through the photocatalytic action of the photocatalytic layer, resulting in degradation of the substrate. For this reason, when the photocatalytic layer is formed on the surface of the organic substrate, an intermediate layer is often formed between the photocatalytic layer and the organic substrate in order to protect the organic substrate.

As an undercoating composition used for such an intermediate layer, there may be mentioned a composition containing polysiloxane and an organic polymer, for example, the composition comprising the organosilane compound and the silyl group-containing vinylic resin. Such a composition that comprises the polysiloxane and the organic polymer is excellent in weatherability and resistance to radicals generated by the photocatalytic action.

There was a problem, however, that increase in the polysiloxane content causes poorer adhesion to organic substrates although the weatherability is improved. Further, there was a problem that increase in the organic polymer content causes poorer weatherability although the adhesion to organic substrates is improved. In addition, since a polysiloxane and an organic polymer were poorly compatible with each other, it was difficult to mix them homogeneously, and the resultant coating film tended to be opaque.

Patent Document 1: Japanese Patent Laid-open Publication No. H01-69673
Patent Document 2: Japanese Patent Laid-open Publication No. H01-69674
Patent Document 3 Japanese Patent Laid-open Publication No. H04-108172
Patent Document 4: Japanese Patent Laid-open Publication No. H04-117473

DISCLOSURE OF THE INVENTION

Problems to be Solved by the Invention

The present invention has been made to solve the above problems associated with the related art. The present invention has an object to provide a coating composition that provides a coating film excellent in transparency and adhesion to organic substrates and has excellent storage stability, and a layered product having a coating film obtained from this coating composition. Another object of the present invention is to provide a coating composition useful for an undercoating composition for a photocatalytic layer, wherein the undercoating composition is, as well as excellent in the above characteristics, capable of forming a coating film (an intermediate layer) that has high resistance to radicals photocatalytically generated, enhances adhesion between an organic substrate and a photocatalytic layer, and causes no decrease in photocatalytic activity of the photocatalytic layer. The present invention has also an object to provide a layered product having a layer formed from this coating composition that is an undercoating composition; a photocatalytic coating film; and a molded product.

Means for Solving the Problems

The present inventors have earnestly studied to solve the above problems and have found that a composition containing a specific organic-inorganic hybrid polymer and a polysiloxane having a specific molecular weight is excellent in storage stability and that a coating film formed by using this composition exhibits excellent adhesion to organic substrates. Furthermore, they have found that this coating film exhibits excellent resistance to photocatalytically-generated radicals and enhances adhesion between the organic substrate and the photocatalytic layer. The present invention has been completed based on these findings.

The coating composition of the present invention comprises an organic-inorganic hybrid polymer (A) and a polysiloxane (B), wherein the organic-inorganic hybrid polymer (A) is prepared by adding a catalyst (c) for accelerating hydrolysis and condensation and water (d) to a mixture of at least one silane compound (a) and a polymer (b), the silane compound (a) being selected from the group consisting of at least one organosilane represented by the formula (1), a hydrolysate of the organosilane and a condensate of the organosilane:

$$R^1_n Si(OR^2)_{4-n} \quad (1)$$

wherein $R^1$ represents a monovalent organic group having 1 to 8 carbon atoms and when two $R^1$s are present, they are the same or different from each other; $R^2$ each independently represents an alkyl group having 1 to 5 carbon atoms or an acyl group having 1 to 6 carbon atoms; and n is an integer of 0 to 2, the polymer (b) having a silyl group containing a silicon atom bonded to a hydrolysable group and/or a hydroxyl group, and the weight ratio (Wa/Wb) of the content (Wa) of the silane compound (a) in the mixture in terms of the completely hydrolyzed condensate to the content (Wb) of the polymer (b) in the mixture in terms of the solid content being in the range from 5/95 to 50/50, provided that Wa+Wb=100; and wherein the polysiloxane (B) has a weight-average molecular weight of 800 to 50,000 and is represented by the average composition formula (2), $$R^3_a SiO_b(OH)_c(OR^4)_d(Y)_e \quad (2)$$

wherein $R^3$ represents an organic group having 1 to 8 carbon atoms and when a plurality of $R^3$s are present, they are the same or different from each other; $R^4$ represents an organic group selected from the group consisting of an alkyl group having 1 to 6 carbon atoms, an acyl group having 1 to 6 carbon atoms, and a phenyl group and when a plurality of $R^4$s are present, they are the same or different from each other; $R^3$ and $R^4$ are the same or different from each other; Y represents a halogen atom or a hydrogen atom; and a, b, c, d, and e each independently is not less than 0 and not more than 4 and they satisfy a+b/2+c+d+e=4.

In the coating composition, the weight ratio [(Wa+WB)/Wb] of the sum of the amount (Wa) of the silane compound (a) used in terms of the completely hydrolyzed condensate and the amount (WB) of the polysiloxane (B) used to the amount (Wb) of the polymer (b) used in terms of the solid content preferably ranges from 40/60 to 95/5, provided that Wa+WB+Wb=100.

The amount of water (d) used preferably ranges from 0.1 to 1.0 mol per mol of all $OR^2$ groups in the silane compound (a)

In the polymer (b), the content of the silyl group containing a silicon atom bonded to a hydrolysable group and/or a hydroxyl group is preferably 0.1 to 2% by weight in terms of the silicon atom content.

In the average composition formula (2), "a" is preferably more than 0 and not more than 2.

Other coating composition of the present invention comprises a condensate of the organic-inorganic hybrid polymer (A) and the polysiloxane (B), which are contained in the coating composition.

Preferably, the coating composition of the present invention further contains inorganic filler (C).

Preferably, the coating composition of the present invention further contains ultraviolet absorber (D1) and/or ultraviolet stabilizer (D2).

The first layered product of the present invention comprises an organic substrate and a coating film formed on the organic substrate, wherein the coating film is obtained from the coating composition.

The undercoating composition for a photocatalytic layer of the present invention is the above coating composition.

The second layered product of the present invention comprises an organic substrate, an intermediate layer formed on the organic substrate, and a photocatalytic layer formed on the intermediate layer, wherein the intermediate layer is formed from the undercoating composition for a photocatalytic layer.

The photocatalytic coating film of the present invention is the layered product, wherein the thickness of the organic substrate is not more than 1000 μm.

The first molded product of the present invention has the photocatalytic coating film on its surface.

The second molded product of the present invention comprises the second layered product.

Effect of the Invention

According to the present invention, a coating composition excellent in storage stability can be obtained, and a coating film excellent in transparency and adhesion to organic substrates can be obtained by using this composition. Moreover, when this composition is used as an undercoating composition for a photocatalytic layer, a layered product excellent in adhesion between the photocatalytic layer and the organic substrate can be obtained, and the degradation of the organic substrate due to the photocatalytic action can be prevented.

BEST MODE FOR CARRYING OUT THE INVENTION

Coating Composition

The coating composition of the present invention contains organic-inorganic hybrid polymer (A) and polysiloxane (B). Firstly, each component used in the present invention will be explained.

(A) Organic-Inorganic Hybrid Polymer:

Organic-inorganic hybrid polymer (A) used in the present invention is prepared by adding catalyst (c) for accelerating hydrolysis and condensation and water (d) to a mixture containing specific silane compound (a) and specific silyl group-containing polymer (b) at a specific ratio.

(a) Silane Compound:

Silane compound (a) used in the present invention is at least one silane compound selected from the group consisting of an organosilane represented by the formula (1) (hereinafter, also referred to as "organosilane (A)"), a hydrolysate of organosilane (A) and a condensate of organosilane (A):

$$R^1_n Si(OR^2)_{4-n} \quad (1)$$

wherein $R^1$ represents a monovalent organic group having 1 to 8 carbon atoms and when two $R^1$s are present, they are the same or different from each other; $R^2$ each independently represents an alkyl group having 1 to 5 carbon atoms or an acyl group having 1 to 6 carbon atoms; and n is an integer of 0 to 2. Among these three types of silane compounds, one type of silane compound may be used, two types of silane compounds arbitrarily selected may be used as a mixture, or all the three types of silane compounds may be used as a mixture. When organosilane (A) is used as silane compound (a), one kind of organosilane (A) may be used alone, or two or more kinds thereof may be used in combination. The hydrolysate and the condensate of organosilane (A) may be formed from one kind of organosilane (A) or formed using two or more kinds of organosilane (A) in combination.

In the hydrolysate of organosilane (A), at least one of 2 to 4 $OR^2$-groups in organosilane (A) may be hydrolyzed. The hydrolysate includes, for example, a hydrolysate in which one $OR^2$-group is hydrolyzed, a hydrolysate in which two or more $OR^2$-groups are hydrolyzed, and a mixture thereof.

The condensate of organosilane (A) is a condensate in which silanol groups in a hydrolysate formed by hydrolysis of organosilane (A) are condensed to form a Si—O—Si bond. In the present invention, all silanol groups are not required to be condensed. The condensate includes a condensate in which a slight part of silanol groups are condensed, a condensate in which most (including all) silanol groups are condensed, a mixture thereof, and the like.

In the formula (1), $R^1$ is a monovalent organic group having 1 to 8 carbon atoms. Specifically, it includes an alkyl group such as methyl, ethyl, n-propyl, i-propyl, n-butyl, i-butyl, sec-butyl, t-butyl, n-hexyl, n-heptyl, n-octyl, and 2-ethylhexyl;

an acyl group such as acetyl, propionyl, butyryl, valeryl, benzoyl, toluyl, and caproyl;

vinyl, allyl, cyclohexyl, phenyl, epoxy, glycidyl, (meth)acryloxy, ureido, amido, fluoroacetamido, isocyanato, and the like.

Further, $R^1$ includes substituted derivatives of the above organic groups and the like. The substituents in such substituted derivative represented by $R^1$ include, for example, a halogen atom, a substituted or unsubstituted amino group, hydroxyl, mercapto, isocyanato, glycidoxy, 3,4-epoxycyclohexyl, (meth)acryloxy, ureido, ammonio, and the like. The number of carbon atoms in $R^1$ that is the substituted derivative is preferably 8 or less including the carbon atoms in the substituent. When a plurality of $R^1$s are present in the formula (1), they are the same or different from each other.

$R^2$ that is the alkyl group having 1 to 5 carbon atoms includes, for example, methyl, ethyl, n-propyl, i-propyl, n-butyl, sec-butyl, t-butyl, n-pentyl, and the like. $R^2$ that is the acyl group having 1 to 6 carbon atoms includes, for example, acetyl, propionyl, butyryl, valeryl, caproyl, and the like. When a plurality of $R^2$s are present in the formula (1), they are the same or different from each other.

Specifically, such organosilane (A) includes tetraalkoxysilanes (n=0 in formula (1)) such as tetramethoxysilane, tetraethoxysilane, tetra-n-propoxysilane, tetra-i-propoxysilane, and tetra-n-butoxysilane; trialkoxysilanes (n=1 in formula (1)) such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, and 3-ureidopropyltriethoxysilane; dialkoxysilanes (n=2 in formula (1)) such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, dicyclohexyldimethoxysilane, dicyclohexyldiethoxysilane, diphenyldimethoxysilane, and diphenyldiethoxysilane; methyltriacetyloxysilane (n=1 in formula (1)), dimethyldiacetyloxysilane (n=2 in formula (1)), and the like.

Among these, a tri-functional silane compound that is represented by n=1 in the formula (1) is mainly used. It is preferred to use a tri-functional silane compound together with a bi-functional silane compound that is represented by n=2 in the formula (1) in terms of the stability of the coating composition of the present invention. As tri-functional silane compounds, trialkoxysilanes are especially preferred. As bi-functional silane compounds, dialkoxysilanes are preferred.

When a tri-functional silane compound and a bi-functional compound are used together, the weight ratio of the tri-functional silane compound to the bi-functional compound is preferably 95/5 to 10/90, more preferably 90/10 to 30/70, and especially preferably 85/15 to 40/60, in terms of the completely hydrolyzed condensate for each, provided that the total of the tri-functional silane compound and the bi-functional compound be 100 (in terms of the completely hydrolyzed condensate). If the content of the tri-functional silane compound is too large, the storage stability of the coating composition may be deteriorated, while if the content of the tri-functional silane compound is too small, the curability of the coating film may be deteriorated. In the present specification, the completely hydrolyzed condensate refers to a condensate in which 100% of —OR groups in a silane compound are hydrolyzed to form SiOH groups and all the SiOH groups are completely condensed to form siloxane structures.

In the present invention, as silane compound (a), one kind of organosilane (A) may be used alone, or two or more kinds of organosilane (A) may be used together. When the compositions of two or more kinds of organosilane (A) used as silane compound (a) are averaged to be represented by the formula (1), the averaged n (hereinafter, also referred to as "average value of n") is preferably 0.5 to 1.9, more preferably 0.6 to 1.7, and especially preferably 0.7 to 1.5. If the average value of n is less than the lower limit, the storage stability of the coating composition may be poor, while if the average value of n exceeds the upper limit, the curability of the coating film may be poor.

The average value of n can be adjusted to the above range by blending di- to tetra-functional silane compounds in an appropriate combination and adjusting the ratio in blending as appropriate.

This is the same with the case where a hydrolysate or a condensate is used as silane compound (a).

In the present invention, as silane compound (a), organosilane (A) may be used as it is, or a hydrolysate and/or a condensate of organosilane (A) may be also used. When the hydrolysate and/or condensate of organosilane (A) are/is used, such a compound may be produced by hydrolysis and condensation of organosilane (A) in advance. However, as described later, it is preferred to prepare the hydrolysate and/or condensate of organosilane (A) by adding water so that organosilane (A) is hydrolyzed and optionally condensed, during preparing organic-inorganic hybrid polymer (A).

The condensate of organosilane (A) has a weight-average molecular weight (hereinafter, represented by "Mw"), as measured by gel permeation chromatography (GPC), of preferably 300 to 100,000 and more preferably 500 to 50,000 in terms of polystyrene.

When the condensate of organosilane (A) is used as silane compound (a) in the present invention, the condensate may be prepared from organosilane (A) described above, or a commercially available organosilane condensate may be used. The commercially available organosilane condensate includes MKC silicate manufactured by Mitsubishi Chemical Corp., ethyl silicate manufactured by Colcoat Co., Ltd., a silicone resin manufactured by Dow Corning Toray Silicone Co., Ltd., a silicone resin manufactured by GE Toshiba Silicones Co., Ltd, a silicone resin and a silicone oligomer manufactured by Shin-Etsu Chemical Co., Ltd., a hydroxyl group-containing polydimethylsiloxane manufactured by Dow Corning Asia Ltd., a silicone oligomer manufactured by Nippon Unicar Company Limited, and the like. These commercially available organosilane condensates may be used as it is or may be further condensed in use.

(b) Silyl Group-Containing Polymer

The polymer (b) containing a specific silyl group (hereinafter, also referred to as "specific silyl group-containing polymer (b)") used in the present invention contains a silyl group having a silicon atom bonded to a hydrolysable group and/or a hydroxyl group (hereinafter, referred to as a "specific silyl group"). Specific silyl group-containing polymer (b) preferably has the specific silyl group at the terminal of polymer chain and/or in a side chain thereof.

The hydrolysable group and/or the hydroxyl group in the specific silyl group are cocondensed with silane compound (a) to form organic-inorganic hybrid polymer (A), and the hydrolysable group and/or the hydroxyl group remaining in organic-inorganic hybrid polymer (A) are further cocondensed with a polysiloxane (B) during film formation, whereby excellent performances are imparted to the coating film.

The content of specific silyl group in specific silyl group-containing polymer (b) is typically 0.1 to 2% by weight, and preferably 0.3 to 1.7% by weight, in terms of the mass of silicon atoms with respect to a polymer before the specific silyl group is introduced. If the specific silyl group content in specific silyl group-containing polymer (b) is less than the lower limit, the covalent bonding site with silane compound (a) or polysiloxane (B) decreases, whereby phase separation is sometimes caused during film formation. Alternatively, if the specific group content exceeds the upper limit, the composition may gelate in storage.

The specific silyl group is preferably a group represented by the formula (3),

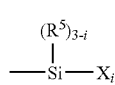
(3)

In the above formula, X represents a hydrolysable group such as halogen atom, alkoxy, acetoxy, phenoxy, thioalkoxy or amino, or a hydroxyl group; $R^5$ represents hydrogen atom, an alkyl group having 1 to 10 carbon atoms, or an aralkyl group having 1 to 10 carbon atoms; and i is an integer of 1 to 3.

Such specific silyl group-containing polymer (b) can be produced, for example, by the following method (I) or (II).

(I) A method of additively reacting a hydrosilane compound having the specific silyl group represented by the formula (3) (hereinafter, also referred to simply as "hydrosilane compound (I)") to the carbon-carbon double bond in a vinylic polymer having a carbon-carbon double bond (hereinafter, referred to as "unsaturated vinylic polymer")

(II) A method of copolymerizing a silane compound represented by the formula (4) (hereinafter, referred to as "unsaturated silane compound (II)") with another vinylic monomer:

(4)

In the above formula, X, $R^5$, and i have the same meaning as X, $R^5$, and i in the formula (3), respectively; and $R^6$ represents an organic group having a polymerizable double bond.

Hydrosilane compound (I) used in method (I) includes, for example, halogenated silanes such as methyldichlorosilane, trichlorosilane, and phenyldichlorosilane; alkoxysilanes such as methyldimethoxysilane, methyldiethoxysilane, phenyldimethoxysilane, trimethoxysilane, and triethoxysilane; acyloxysilanes such as methyldiacetoxysilane, phenyldiacetoxysilane, and triacetoxysilane; aminoxysilanes such as methyldiaminoxysilane, triaminoxysilane, and dimethylaminoxysilane; and the like. Hydrosilane compound (I) may be used alone or as a mixture of two or more.

The unsaturated vinylic polymer used in method (I) is not specifically limited if it is not a polymer having a hydroxyl group. It can be produced, for example, by the following method (I-1) or (I-2), or a combination thereof.

(I-1) A method in which a vinylic monomer having a functional group (hereinafter, referred to as "functional group (α)") is (co)polymerized and then the functional group (α) in the resultant (co)polymer is reacted with an unsaturated compound having a functional group (hereinafter, referred to as "functional group (β)") capable of reacting with the functional group (α) and a carbon-carbon double bond to produce an unsaturated vinylic polymer having a carbon-carbon double bond in a side chain of the polymer chain.

(I-2) A method in which a vinylic monomer is (co)polymerized using a radical polymerization initiator having functional group (α) (for example, 4,4'-azobis(4-cyanovaleric acid)) or using both a radical polymerization initiator having functional group (α) and a chain transfer agent having functional group (α) (for example, 4,4'-azobis(4-cyanovaleric acid) and dithioglycolic acid) to synthesize a (co)polymer having functional group (α), which is derived from the radical polymerization initiator or the chain transfer agent, at one or both of terminals in the polymer chain, and subsequently functional group (α) in the (co)polymer is reacted with an unsaturated compound having functional group (β) and a carbon-carbon double bond to produce an unsaturated vinylic polymer having a carbon-carbon double bond at one or both of terminals in the polymer chain.

As the reaction of functional group (α) with functional group (β) in methods (I-1) and (I-2), there may be mentioned, for example, esterification of a carboxyl group with a hydroxyl group, ring-opening esterification of a carboxylic anhydride group with a hydroxyl group, ring-opening esterification of a carboxyl group with an epoxy group, amidation of a carboxyl group with an amino group, ring-opening amidation of a carboxylic anhydride group with an amino group, ring-opening addition of an epoxy group with an amino group, urethane formation from a hydroxyl group and an isocyanato group, a combination of these reactions, and the like.

The vinylic monomer having functional group (α) includes, for example, unsaturated carboxylic acids such as (meth)acrylic acid, crotonic acid, maleic acid, fumaric acid, and itaconic acid; unsaturated carboxylic anhydrides such as maleic anhydride and itaconic anhydride; hydroxyl group-containing vinylic monomers such as 2-hydroxyethyl(meth)acrylate, 2-hydroxypropyl(meth)acrylate, 3-hydroxypropyl (meth)acrylate, N-methylol(meth)acrylamide, and 2-hydroxyethyl vinyl ether; amino group-containing vinylic monomers such as 2-aminoethyl(meth)acrylate, 2-aminopropyl(meth)acrylate, 3-aminopropyl(meth)acrylate, and 2-aminoethyl vinyl ether; aminoimido group-containing vinylic monomers such as 1,1,1-trimethylamine(meth)acrylimide, 1-methyl-1-ethylamine(meth)acrylimide, 1,1-dimethyl-1-(2-hydroxypropyl)amine(meth)acrylimide, 1,1-dimethyl-1-(2'-phenyl-2'-hydroxyethyl)amine(meth)acrylimide, and 1,1-dimethyl-1-(2'-hydroxy-2'-phenoxypropyl)amine(meth) acrylimide; and epoxy group-containing vinylic monomers such as glicydyl(meth)acrylate and allyl glycidyl ether; and the like. These vinylic monomers having functional group (α) may be used alone or as a mixture of two or more.

Other vinylic monomers copolymerizable with the vinylic monomer having functional group (α) include, for example, aromatic vinyl monomers such as styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 3,4-diethylstyrene, 2-chlorostyrene, 3-chlorostyrene, 4-chloro-3-methylstyrene, 4-t-butylstyrene, 2,4-dichlorostyrene, 2,6-dichlorostyrene, and 1-vinylnaphthalene;

(meth)acrylates such as methyl(meth)acrylate, ethyl(meth) acrylate, propyl(meth)acrylate, n-butyl(meth)acrylate, i-butyl(meth)acrylate, amyl(meth)acrylate, i-amyl(meth)acrylate, hexyl(meth)acrylate, 2-ethylhexyl(meth)acrylate, n-octyl(meth)acrylate, and cyclohexyl methacrylate;

multifunctional monomers such as divinylbenzene, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth) acrylate, tetrapropylene glycol di(meth)acrylate, butanediol di(meth)acrylate, hexanediol di(meth)acrylate, trimethylolpropane tri(meth)acrylate, and pentaerythritol tetra(meth) acrylate;

acid amide compounds such as (meth)acrylamide, N-methylol(meth)acrylamide, N-methoxymethyl(meth)acrylamide, N-butoxymethyl(meth)acrylamide, N,N'-methylenebisacrylamide, diacetoneacrylamide, maleamide, and maleimide;

vinyl compounds such as vinyl chloride, vinylidene chloride, and fatty acid vinyl ester; aliphatic conjugated dienes such as 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene, isoprene, a substituted linear conjugated pentadiene substituted with alkyl, halogen atom, cyano, or the like, and a linear or branched conjugated hexadiene;

vinyl cyanides such as acrylonitrile and methacrylonitrile;

fluorine-containing monomers such as trifluoroethyl (meth)acrylate and pentadecafluorooctyl (meth)acrylate;

piperidine monomers such as 4-(meth)acryloyloxy-2,2,6,6-tetramethylpiperidine, 4-(meth)acryloylamino-2,2,6,6-tetramethylpiperidine, and 4-(meth)acryloyloxy-1,2,2,6,6-pentamethylpiperidine;

ultraviolet-absorbing monomers such as 2-(2'-hydroxy-5'-methacryloxyethylphenyl)-2H-benzotriazole, 2-(2'-hydroxy-3'-t-butyl-5'-methacryloxyethylphenyl)-2H-benzotriazole, 2-hydroxy-4-(methacryloyloxyethoxy) benzophenone, and 2-hydroxy-4-(acryloyloxyethoxy) benzophenone;

dicaprolactone, and the like. These monomers may be used alone or in combination of two or more.

The unsaturated compound having functional group (β) and a carbon-carbon double bond includes, for example, vinylic monomers like the vinylic monomers having functional group (α), an isocyanate group-containing unsaturated compound obtained by reacting the above hydroxyl group-containing vinylic monomer with a diisocyanate in an equimolar amount, and the like.

Unsaturated silane compound (II) used in method (II) includes, for example, $CH_2=CHSi(CH_3)(OCH_3)_2$, $CH_2=CHSi(OCH_3)_3$,
$CH_2=CHSi(CH_3)Cl_2$, $CH_2=CHSiCl_3$,
$CH_2=CHCOO(CH_2)_2Si(CH_3)(OCH_3)_2$,
$CH_2=CHCOO(CH_2)_2Si(OCH_3)_3$,
$CH_2=CHCOO(CH_2)_3Si(CH_3)(OCH_3)_2$,
$CH_2=CHCOO(CH_2)_3Si(OCH_3)_3$,
$CH_2=CHCOO(CH_2)_2Si(CH_3)Cl_2$,
$CH_2=CHCOO(CH_2)_2SiCl_3$,
$CH_2=CHCOO(CH_2)_3Si(CH_3)Cl_2$,
$CH_2=CHCOO(CH_2)_3SiCl_3$,
$CH_2=C(CH_3)COO(CH_2)_2Si(CH_3)(OCH_3)_2$,
$CH_2=C(CH_3)COO(CH_2)_2Si(OCH_3)_3$,
$CH_2=C(CH_3)COO(CH_2)_3Si(CH_3)(OCH_3)_2$,
$CH_2=C(CH_3)COO(CH_2)_3Si(OCH_3)_3$,
$CH_2=C(CH_3)COO(CH_2)_2Si(CH_3)Cl_2$,
$CH_2=C(CH_3)COO(CH_2)_2SiCl_3$,
$CH_2=C(CH_3)COO(CH_2)_3Si(CH_3)Cl_2$,
$CH_2=C(CH_3)COO(CH_2)_3SiCl_3$,

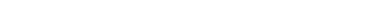

-continued

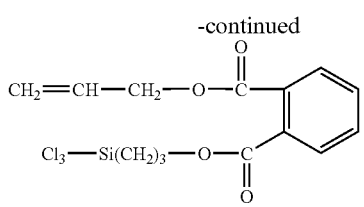

These may be used alone or in combination of two or more.

Other vinylic monomers to be copolymerized with the unsaturated silane compound include, for example, the vinylic monomers having functional group (α) and other vinylic monomers listed for the method (I-1).

The process for producing specific silyl group-containing polymer (b) includes, for example, a process in which all of the monomer are added together to perform polymerization, a process in which a part of the monomer is polymerized and subsequently the residual part is added continuously or intermittently to perform polymerization, a process in which the monomer is continuously added from the start of polymerization, and the like. These polymerization methods may be used in combination.

A preferred polymerization process includes a solution polymerization. The solvent used in the solution polymerization is not specifically limited as long as specific silyl group-containing polymer (b) can be produced. It includes, for example, alcohols, aromatic hydrocarbons, ethers, ketones, esters, and the like. The alcohols include methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene glycol monomethyl ether acetate, diacetone alcohol, and the like. The aromatic hydrocarbons include benzene, toluene, xylene, and the like; the ethers include tetrahydrofuran, dioxane, and the like; the ketones include acetone, methyl ethyl ketone, methyl isobutyl ketone, diisobutyl ketone, and the like; and the esters include ethyl acetate, propyl acetate, butyl acetate, propylene carbonate, methyl lactate, ethyl lactate, n-propyl lactate, isopropyl lactate, methyl 3-ethoxypropionate, ethyl 3-ethoxypropionate, and the like. These organic solvents may be used alone or as a mixture of two or more.

In the above polymerization, as a polymerization initiator, a molecular weight adjuster, a chelating agent, and an inorganic electrolyte, publicly-known such agents may be used.

As specific silyl group-containing polymer (b) in the present invention, there may be used, besides the specific silyl group-containing polymer produced by polymerization as described above, another specific silyl group-containing polymer such as a specific silyl group-containing epoxy resin and a specific silyl group-containing polyester resin. The specific silyl group-containing epoxy resin may be produced, for example, by reacting an epoxy group in an epoxy resin, such as bisphenol A-based epoxy resin, bisphenol F-based epoxy resin, hydrogenated bisphenol A-based epoxy resin, an aliphatic polyglycidyl ether, and an aliphatic polyglycidyl ester, with a specific silyl group-containing aminosilane, vinylsilane, carboxysilane or glycidylsilane. The specific silyl group-containing polyester resin may be produced, for example, by reacting a carboxyl group or a hydroxyl group contained in the polyester resin with a specific silyl group-containing aminosilane, carboxysilane, or glycidylsilane.

For specific silyl group-containing polymer (b), Mw, as measured by GPC, is preferably of 2,000 to 100,000 and more preferably 3,000 to 50,000 in terms of polystyrene.

In the present invention, specific silyl group-containing polymer (b) may be used alone or as a mixture of two or more.

(c) Catalyst

Catalyst (c) used in the present invention is added to a mixture of silane compound (a) and specific silyl group-containing polymer (b) to accelerate the hydrolysis and condensation of silane compound (a) and specific silyl group-containing polymer (b). The addition of catalyst (c) increases the degree of crosslinking of resultant organic-inorganic hybrid polymer (A) and increases the molecular weight of polysiloxane formed by the polycondensation of organosilane (A). As a result, coating films excellent in strength, long-term durability, and other properties can be obtained. Furthermore, thick coating films can be readily obtained, and the coating workability is improved. Moreover, the addition of catalyst (c) accelerates the reaction of silane compound (a) with specific silyl group-containing polymer (b) and forms sufficient reaction sites (alkoxy groups) in organic-inorganic hybrid polymer (A). As a result, the phase separation between organic-inorganic hybrid polymer (A) and polysiloxane (B) is unlikely to occur during film formation following the addition of polysiloxane (B), the whitening of coating film can be prevented, and the transparency of coating film can be attained.

Such catalyst (c) includes an acidic compound, an alkaline compound, a salt, an amine, an organometallic compound and/or its partial hydrolysate (hereinafter, organometallic compound and/or its partial hydrolysate are referred to as "organometal-based compound").

The acidic compound includes, for example, acetic acid, hydrochloric acid, sulfuric acid, phosphoric acid, alkyltitanic acid, p-toluenesulfonic acid, phthalic acid, and the like. Among them, acetic acid is preferred.

The alkaline compound includes, for example, sodium hydroxide, potassium hydroxide, and the like. Among them, sodium hydroxide is preferred.

The salt includes alkali metal salts of naphthenic acid, octanoic acid, nitrous acid, sulfurous acid, aluminic acid, carbonic acid, or the like.

The amine includes, for example, ethylenediamine, hexamethylenediamine, diethylenetriamine, triethylenetetramine, tetraethylenepentamine, piperidine, piperazine, m-phenylenediamine, p-phenylenediamine, ethanolamine, triethylamine, (3-aminopropyl)trimethoxysilane, (3-aminopropyl)triethoxysilane, [3-(2-aminoethyl)aminopropyl]trimethoxysilane, [3-(2-aminoethyl)aminopropyl]triethoxysilane, [3-(2-aminoethyl)aminopropyl]methyldimethoxysilane, 3-anilinopropyltrimethoxysilane, alkylamine salts, quaternary ammonium salts, and the like. In addition, various modified amines used as a curing agent for epoxy resin may be also used. Among them, preferred are (3-aminopropyl)trimethoxysilane, (3-aminopropyl)triethoxysilane, and [3-(2-aminoethyl)aminopropyl]trimethoxysilane.

The organometal-based compound includes, for example, a compound represented by the formula (5) (hereinafter, referred to as "organometallic compound (5)"), $$M(OR^7)_r(R^8COCHCOR^9)_s \quad (5)$$

wherein M represents at least one metal atom selected from the group consisting of zirconium, titanium, and aluminum; $R^7$ and $R^8$ each independently represents a monovalent hydrocarbon group having 1 to 6 carbon atoms such as methyl, ethyl, n-propyl, i-propyl, n-butyl, sec-butyl, t-butyl, n-pentyl, n-hexyl, cyclohexyl, and phenyl; $R^9$ represents the aforementioned monovalent hydrocarbon group having 1 to 6 carbon atoms or an alkoxy group having 1 to 16 carbon atoms such as methoxy, ethoxy, n-propoxy, i-propoxy, n-butoxy, sec-butoxy, t-butoxy, lauryloxy, and stearyloxy; and r and s are each an integer of 0 to 4 and satisfy the relationship (r+s)=(valence of M), an organic derivative of four-valent tin in which one or two alkyl groups having 1 to 10 carbon atoms bond to one tin atom (hereinafter, referred to as "organotin compound"), and a partial hydrolysate thereof, and the like.

Organometallic compound (5) includes, for example, organozirconium compounds such as tetra-n-butoxyzirconium, tri(n-butoxy)ethylacetoacetatozirconium, di(n-butoxy)bis(ethylacetoacetato)zirconium, n-butoxytris(ethylacetoacetato)zirconium, tetrakis(n-propylacetoacetato)zirconium, tetrakis(acetylacetoacetato)zirconium, and tetrakis(ethylacetoacetato)zirconium;

organotitanium compounds such as tetra(i-propoxy)titanium, di(i-propoxy)bis(ethylacetoacetato)titanium, di(i-propoxy)bis(acetylacetato)titanium and di(i-propoxy)bis(acetylacetonato)titanium; and organoaluminum compounds such as tri-i-propoxyaluminum, di(i-propoxy)ethylacetoacetatoaluminum, di(i-propoxy)acetylacetonatoaluminum, i-propoxybis(ethylacetoacetato)aluminum, i-propoxybis(acetylacetonato)aluminum, tris(ethylacetoacetato)aluminum, tris(acetylacetonato)aluminum, and mono(acetylacetonato)bis(ethylacetoacetato)aluminum.

Among these organometallic compounds (5) and their partial hydrolysates, tri-n-butoxy(ethylacetoacetato)zirconium, di(i-propoxy)bis(acetylacetonato)titanium, di(i-propoxy)ethylacetoacetatoaluminum, tris(ethylacetoacetato)aluminum, or a partial hydrolysate thereof is preferably used.

The organotin compound includes, for example, carboxylate-based organotin compounds such as
$(C_4H_9)_2Sn(OCOC_{11}H_{23})_2$,
$(C_4H_9)_2Sn(OCOCH=CHCOOCH_3)_2$,
$(C_4H_9)_2Sn(OCOCH=CHCOOC_4H_9)_2$,
$(C_8H_{17})_2Sn(OCOC_8H_{17})_2$,
$(C_8H_{17})_2Sn(OCOC_{11}H_{23})_2$,
$(C_8H_{17})_2Sn(OCOCH=CHCOOCH_3)_2$,
$(C_8H_{17})_2Sn(OCOCH=CHCOOC_4H_9)_2$,
$(C_8H_{17})_2Sn(OCOCH=CHCOOC_8H_{17})_2$,
$(C_8H_{17})_2Sn(OCOCH=CHCOOC_{16}H_{33})_2$,
$(C_8H_{17})_2Sn(OCOCH=CHCOOC_{17}H_{35})_2$,
$(C_8H_{17})_2Sn(OCOCH=CHCOOC_{18}H_{37})_2$,
$(C_8H_{17})_2Sn(OCOCH=CHCOOC_{20}H_{41})_2$,
$(C_4H_9)Sn(OCOC_{11}H_{23})_3$,
$(C_4H_9)Sn(OCONa)_3$, and

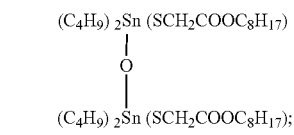

mercaptide-based organotin compounds such as
$(C_4H_9)_2Sn(SCH_2COOC_8H_{17})_2$,
$(C_4H_9)_2Sn(SCH_2CH_2COOC_8H_{17})_2$,
$(C_8H_{17})_2Sn(SCH_2COOC_8H_{17})_2$,
$(C_8H_{17})_2Sn(SCH_2CH_2COOC_8H_{17})_2$,
$(C_8H_{17})_2Sn(SCH_2COOC_{12}H_{25})_2$,
$(C_8H_{17})_2Sn(SCH_2CH_2COOC_{12}H_{25})_2$,
$(C_4H_9)Sn(SCOCH=CHCOOC_8H_{17})_3$,
$(C_8H_{17})Sn(SCOCH=CHCOOC_8H_{17})_3$, and

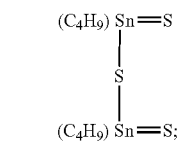

sulfide-based organotin compounds such as $(C_4H_9)_2Sn=S$, $(C_8H_{17})_2Sn=S$, and

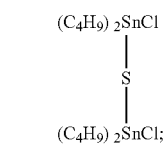

chloride-based organotin compounds such as
$(C_4H_9)SnCl_3$,
$(C_4H_9)_2SnCl_2$,
$(C_8H_{17})_2SnCl_2$, and

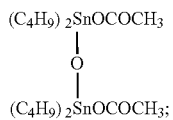

organotin oxides such as $(C_4H_9)_2SnO$ and $(C_8H_{17})_2SnO$, and a reaction product of such an organotin oxide with an ester compound such as silicate, dimethyl maleate, diethyl maleate, and dioctyl phthalate; and the like.

The catalyst (c) may be used alone or as a mixture of two or more, and it may be used as a mixture with a zinc compound or another reaction retardant.

In the case of catalyst (c) other than organometal-based compounds, the amount of catalyst (c) to be used is typically 0.001 to 100 parts by weight, preferably 0.01 to 80 parts by weight, and more preferably 0.1 to 50 parts by weight, with respect to 100 parts by weight of silane compound (a) (in terms of the completely hydrolyzed condensate of organosilane (A)). When catalyst (c) is an organometal-based compound, the amount catalyst (c) to be used is typically not more than 100 parts by weight, preferably 0.1 to 80 parts by weight, and more preferably 0.5 to 50 parts by weight, with respect to 100 parts by weight of silane compound (a) (in terms of the completely hydrolyzed condensate of organosilane (A)). If the amount of catalyst (c) exceeds the upper limit, the storage stability of the composition may be deteriorated or the degree of crosslinking of organic-inorganic hybrid polymer (A) may become too high.

(d) Water

In the present invention, organic-inorganic hybrid polymer (A) is prepared through cocondensation of silane compound (a) and specific silyl group-containing polymer (b) by adding water to a mixture of silane compound (a) and specific silyl group-containing polymer (b).

The amount of water added during the cocondensation is typically 0.1 to 1.0 mol, preferably 0.2 to 0.8 mol, and more preferably 0.25 to 0.6 mol, per mol of all $OR^2$ groups in silane compound (a). When the amount of water is within the above range, the composition is unlikely to gelate and hence has good storage stability. Moreover, when the amount of water is within the above range, sufficiently crosslinked organic-inorganic hybrid polymer (A) can be obtained, and when a coating film is formed using a coating composition containing such organic-inorganic hybrid polymer (A), dissolution and occurrence of lifting of the coating film can be suppressed even when a photocatalytic layer is formed on the coating film.

(e) Organic Solvent

In the present invention, the organic solvent used in preparing the silyl group-containing polymer (b) may be used as it is. The organic solvent (e) may be added where necessary in order to adjust the concentration of the solid content in preparing organic-inorganic hybrid polymer (A). When silyl group-containing polymer (b) is used after removing the organic solvent used in preparation thereof, organic solvent (e) may be newly added.

Organic solvent (c) may be added in such an amount that the concentration of the solid content in preparing organic-inorganic hybrid polymer (A) is preferably 10 to 60% by weight, more preferably 15 to 50% by weight, and especially preferably 20 to 40% by weight. When the organic solvent used in preparing silyl group-containing polymer (b) is used as it is and the concentration of the solid content in preparing organic-inorganic hybrid polymer (A) is within the above range, organic solvent (e) may or may not be added.

The reactivity of silane compound (a) and specific silyl group-containing polymer (b) can be controlled by adjusting the concentration of the solid content in preparing organic-inorganic hybrid polymer (A). If the concentration of the solid content in preparing organic-inorganic hybrid polymer (A) is less than the lower limit, the reactivity of silane compound (a) and specific silyl group-containing polymer (b) decreases, and the resultant organic-inorganic hybrid polymer (A) may have poor compatibility with polysiloxane (B) described later, whereby whitening of the coating film is possibly caused. If the concentration of the solid content in preparing organic-inorganic hybrid polymer (A) exceeds the upper limit, gelation sometimes occurs. For the concentration of the solid content referred here, the amount of solid content is the total of the amount (Wa) of silane compound (a) in terms of the completely hydrolyzed condensate and the amount (Wb) of specific silyl group-containing polymer (b) in terms of the solid content.

Organic solvent (e) is not specifically limited if the above components can be homogeneously mixed therein. It includes alcohols, aromatic hydrocarbons, ethers, ketones, and esters, which were listed as the solvents to be used for producing specific silyl group-containing polymer (b). These organic solvents may be used alone or as a mixture of two or more.

(f) Stability Improver

In the present invention, stability improver (f) is preferably added after preparing organic-inorganic hybrid polymer (A) as necessary in order to improve the storage stability of a coating composition, especially organic-inorganic hybrid polymer (A). The stability improver used in the present invention is at least one compound selected from the group consisting of β-diketones represented by the formula (6), β-ketoesters, carboxylic acids, dihydroxy compounds, amines and oxyaldehydes:

$$R^{10}COCH_2COR^{11} \quad (6)$$

wherein $R^{10}$ represents a monovalent hydrocarbon group having 1 to 6 carbon atoms such as methyl, ethyl, n-propyl, i-propyl, n-butyl, sec-butyl, t-butyl, n-pentyl, n-hexyl, cyclohexyl, and phenyl; and $R^{11}$ represents the aforementioned monovalent hydrocarbon group having 1 to 6 carbon atoms or an alkoxy group having 1 to 16 carbon atoms such as methoxy, ethoxy, n-propoxy, i-propoxy, n-butoxy, sec-butoxy, t-butoxy, lauryloxy, and allyloxy.

When an organometal-based compound is used as catalyst (c), stability improver (f) represented by formula (6) is preferably added. It is deemed that use of stability improver (f) can further improve the storage stability of the resultant coating composition, especially organic-inorganic hybrid polymer (A), because stability improver (f) coordinates to the metal atom in the organometal-based compound, and this coordination suppresses excessive cocondensation of silane compound (a) with specific silyl group-containing polymer (b)

Such stability improver (f) includes, for example, acetylacetone, methyl acetoacetate, ethyl acetoacetate, n-propyl acetoacetate, i-propyl acetoacetate, n-butyl acetoacetate, sec-butyl acetoacetate, t-butyl acetoacetate, hexane-2,4-dione, heptane-2,4-dione, heptane-3,5-dione, octane-2,4-dione, nonane-2,4-dione, 5-methylhexane-2,4-dione, malonic acid, oxalic acid, phthalic acid, glycolic acid, salicylic acid, aminoacetic acid, iminoacetic acid, ethylenediaminetetraacetic acid, glycol, cathecol, ethylenediamine, 2,2'-bipyridine, 1,10-phenanthroline, diethylenetriamine, 2-ethanolamine, dimethylglyoxime, dithizone, methionine, salicyl aldehyde, and the like. Among these, acetylacetone and ethyl acetoacetate are preferred.

Stability improver (f) may be used alone or as a mixture of two or more.

The amount of stability improver (f) used in the present invention is typically not less than 2 mol, and preferably 3 to 20 mol, per mol of organometallic compound in the organometal-based compound. If the amount of stability improver (f) is less than the lower limit, the improving effect on storage stability of the resultant composition is sometimes insufficient.

(Preparation Method of Organic-Inorganic Hybrid Polymer (A))

Organic-inorganic hybrid polymer (A) used in the present invention can be prepared through cocondensation of silane compound (a) with specific silyl group-containing polymer (b) by adding catalyst (c) for hydrolysis and condensation and water (d) to a mixture of silane compound (a) and specific silyl group-containing polymer (b).

The weight ratio (Wa/Wb) of the content (Wa) of silane compound (a) to the content (Wb) of specific silyl group-containing polymer (b) is 5/95 to 50/50 and preferably 15/75 to 40/60, provided that Wa+Wb=100. Herein, Wa is the content of silane compound (a) in terms of the completely hydrolyzed condensate, and Wb is the content of specific silyl group-containing polymer (b) in terms of the solid content. When the weight ratio (Wa/Wb) is within the above range, a coating film excellent in transparency, long-term adhesion to organic substrates, and alkali resistance can be obtained.

Specifically, organic-inorganic hybrid polymer (A) is preferably prepared by any of the following methods (1) to (3).

(1) To a mixed solution of silane compound (a), specific silyl group-containing polymer (b), and catalyst (c) for hydrolysis and condensation, water (d) is added in an amount within the above range, and cocondensation of silane compound (a) with specific silyl group-containing polymer (b) is performed at a temperature of 40 to 80° C. for 0.5 to 12 hours to prepare organic-inorganic hybrid polymer (A). After that, other additives such as stability improver (f) may be added where necessary.

(2) To organosilane (A) used as silane compound (a), water (d) is added in an amount within the above range, and hydrolysis and condensation are carried out at a temperature of 40 to 80° C. for 0.5 to 12 hours. Subsequently, specific silyl group-containing polymer (b) and catalyst (c) for hydrolysis and condensation are added with mixing, and the condensation is performed at a temperature of 40 to 80° C. for 0.5 to 12 hours to prepare organic-inorganic hybrid polymer (A). After that, other additives such as stability improver (f) may be added where necessary.

(3) To a mixed solution of silane compound (a), specific silyl group-containing polymer (b), catalyst (c) for hydrolysis and condensation, and stability improver (f), water (d) is added in an amount within the above range, and hydrolysis and condensation of silane compound (a) and specific silyl group-containing polymer (b) are performed at a temperature of 40 to 80° C. for 0.5 to 12 hours to prepare organic-inorganic hybrid polymer (A). After that, other additives such as stability improver (f) may be added where necessary.

When organic-inorganic hybrid polymer (A) is formed in advance by cocondensing silane compound (a) with specific silyl group-containing polymer (b) as described above, a coating composition excellent in storage stability can be obtained, and due to improvement in the reactivity with polysiloxane (B) described later, the phase separation of organic-inorganic hybrid polymer (A) and polysiloxane (B) can be avoided during film formation, whereby a coating film excellent in transparency can be provided. Furthermore, a coating film excellent in resistance to radicals generated from the photocatalytic layer can be obtained.

(B) Polysiloxane

Polysiloxane (B) used in the present invention is a polysiloxane represented by the average composition formula (2),

$$R^3{}_a SiO_b(OH)_c(OR^4)_d(Y)_e \quad (2)$$

wherein $R^3$ represents an organic group having 1 to 8 carbon atoms and when a plurality of $R^3$s are present, they are the same or different from each other; $R^4$ represents an organic group selected from the group consisting of an alkyl group having 1 to 6 carbon atoms, an acyl group having 1 to 6 carbon atoms, and a phenyl group, and when a plurality of $R^4$s are present, they are the same or different from each other; $R^3$ and $R^4$ are the same or different from each other; Y represents a halogen atom or a hydrogen atom; and a, b, c, d, and e each independently is not less than 0 and not more than 4 and they satisfy a+b/2+c+d+e=4.

The weight-average molecular weight (Mw), as measured by GPC, of polysiloxane (B) is 800 to 50,000, preferably 1,000 to 40,000, more preferably 2,000 to 40,000, and especially preferably 3,000 to 30,000 in terms of polystyrene. When Mw of polysiloxane (B) is within the above range, a coating film excellent in adhesion to organic substrates and curability can be obtained.

Among the above polysiloxanes (B), it is preferred to use a polysiloxane represented by the average composition formula (2) in which "a" is typically more than 0 and not more than 2, and preferably not less than 0.5 and not more than 1.8. When "a" is within the above range, a coating film excellent in adhesion to organic substrates can be obtained. The value of "a" can be controlled by adjusting the type of organosilanes (B) described later and the ratio in blending as appropriate.

The polysiloxane (B) can be produced, for example, by hydrolysis and condensation of an organosilane represented by formula (7) below (hereinafter, referred to as "organosilane (B)"),

$$R^3{}_n Si(OR^4)_{4-n} \quad (7)$$

(wherein $R^3$ represents a monovalent organic group having 1 to 8 carbon atoms and when a plurality of $R^3$s are present, they are the same or different from each other; $R^4$ represents an alkyl group having 1 to 5 carbon atoms or an acyl group having 1 to 6 carbon atoms and when a plurality of $R^4$s are present, they are the same or different from each other; $R^3$ and $R^4$ are the same or different from each other; and n is an integer of 0 to 3.

In the formula (7), $R^3$ is a monovalent organic group having 1 to 8 carbon atoms. Specifically, it includes alkyl groups such as methyl, ethyl, n-propyl, i-propyl, n-butyl, i-butyl, sec-butyl, t-butyl, n-hexyl, n-heptyl, n-octyl, and 2-ethylhexyl;

acyl groups such as acetyl, propionyl, butyryl, valeryl, benzoyl, toluyl, caproyl;

vinyl, allyl, cyclohexyl, phenyl, epoxy, glycidyl, (meth)acryloxy, ureido, amido, fluoroacetoamido, isocyanate; and the like.

Further, $R^3$ also includes substituted derivatives of the above organic groups and the like. Substituents in the substituted derivatives represented by $R^3$ include, for example, a halogen atom, a substituted or unsubstituted amino group, hydroxyl, mercapto, isocyanato, glycidoxy, 3,4-epoxycyclohexyl, (meth)acryloxy, ureido, ammonio, and the like. Preferably, the number of carbon atoms in $R^3$ that is the substituted derivative is not more than 8 including the carbon atoms in the substituent. When a plurality of $R^3$s are present in formula (7), they are the same or different from each other.

$R^4$ that is the alkyl group having 1 to 5 carbon atoms includes, for example, methyl, ethyl, n-propyl, i-propyl, n-butyl, sec-butyl, t-butyl, n-pentyl, and the like. $R^4$ that is the acyl group having 1 to 6 carbon atoms includes, for example, formyl, acetyl, propionyl, butyryl, valeryl, toluyl, caproyl, and the like. When a plurality of $R^4$s are present in formula (7), they are the same or different from each other.

Specifically, such organosilane (B) includes tetraalkoxysilanes such as tetramethoxysilane, tetraethoxysilane, tetra-n-propoxysilane, tetra-i-propoxysilane, and tetra-n-butoxysilane;

trialkoxysilanes such as methytrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysialne, 2-hydroxyethyltriethoxysialne, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)

acryloxypropyltrimethoxysilane, 3-(meth)acryloxypropyltriethoxysilane, 3-ureidopropyltrimethoxysilane, and 3-ureidopropyltriethoxysilane;

dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, dicyclohexyldimethoxysilane, dicyclohexyldiethoxysilane, diphenyldimethoxysilane, and diphenyldiethoxysilane;

monoalkoxysilanes such as trimethylmethoxysilane, trimethylethoxysilane, triethylmethoxysilane, and triethylethoxysilane;

methyltriacetyloxysilane, dimethyldiacetyloxysilane; and the like.

Among these, tetraalkoxysilanes, trialkoxysilanes, and dialkoxysilanes are preferred.

As organosilane (B) used in the present invention, the above organosilanes may be used alone or as a mixture of two or more. When two or more of the organosilanes are mixed, it is preferred to mainly use trialkoxysilanes and/or dialkoxysilanes since the coating film obtained is flexible, well follows deformation of an organic substrate, and exhibits excellent adhesion to organic substrates. In this case, the total amount of trialkoxysilanes and dialkoxysilanes is preferably not less than 10% by weight and not more than 100% by weight, in terms of the completely hydrolyzed condensate, with respect to the whole organosilane (B).

Polysiloxane (B) is a polysiloxane in which silanol groups in a hydrolysate formed by hydrolysis of organosilane (B) are condensed to form a Si—O—Si bond. In the present invention, the hydrolysate may be a hydrolysate in which at least one of 1 to 4 $OR^4$-groups contained in organosilane (B) is hydrolyzed, for example, a hydrolysate in which one $OR^4$-group is hydrolyzed, a hydrolysate in which two or more $OR^4$-groups are hydrolyzed, or a mixture thereof. All silanol groups in the hydrolysate are not required to be condensed. The polysiloxane (B) includes a condensate in which a slight part of silanol groups are condensed, a condensate in which most (including all) silanol groups are condensed, a mixture thereof, and the like.

In the present invention, a polysiloxane obtained from a halogenated silane may be also used as polysiloxane (B). In this polysiloxane, elimination of all halogen atoms and subsequent condensation are not required. The polysiloxane (B) also includes a condensate derived by elimination of a slight part of halogen atoms and subsequent condensation, a condensate derived by elimination of most (including all) halogen atoms and subsequent condensation, a alkoxy-modified compound in which the halogen atom is replaced with an alcohol, a compound in which the group having halogen atom is partially hydrolyzed by water to form a silanol group, a mixture thereof, and the like.

Polysiloxane (B) in the present invention may be prepared by hydrolysis and condensation of the organosilane (B) or prepared from a halogenated silane such as chlorosilane. A commercially available polysiloxane may be also used. The commercially available polysiloxane includes MKC silicate manufactured by Mitsubishi Chemical Corp., ethyl silicate manufactured by Colcoat Co., Ltd., a silicone resin manufactured by Dow Corning Toray Silicone Co., Ltd., a silicone resin manufactured by GE Toshiba Silicones Co., Ltd., a silicone resin manufactured by Shin-Etsu Chemical Co., Ltd., hydroxyl group-containing polydimethylsiloxane manufactured by Dow Corning Asia Ltd., a silicone oligomer manufactured by Nippon Unicar Company Limited, and the like.

In the coating composition of the present invention, polysiloxane (B) is used in such an amount that (Wa+WB)/Wb is typically 40/60 to 95/5 and preferably 50/50 to 90/10, assuming that the amount (in terms of the completely hydrolyzed condensate) of silane compound (a) used in organic-inorganic hybrid polymer (A) is Wa, the amount (in terms of the solid content) of specific silyl group-containing polymer (b) used in organic-inorganic hybrid polymer (A) is Wb, the amount of polysiloxane (B) used is WB, and Wa+WB+Wb=100. When the ratio (Wa+WB)/Wb is within the above range, the composition can provide coating films excellent in adhesion to organic substrates and radical resistance.

(C) Inorganic Filler

The coating composition of the present invention may contain inorganic filler (C) as necessary, for example, in order to enhance the strength of coating film. Inorganic filler (C) includes an inorganic compound that is used in a powder, sol, or colloid form, which is blended according to the desired characteristics of coating film.

The inorganic compound includes $SiO_2$, $Al_2O_3$, AlGaAs, $Al(OH)_3$, $Sb_2O_5$, $Si_3N_4$, Sn—$In_2O_3$, Sb—$In_2O_3$, MgF, $CeF_3$, $CeO_2$, $3Al_2O_3.2SiO_2$, BeO, SiC, AlN, Fe, Co, Co—$FeO_x$, $CrO_2$, $Fe_4N$, $BaTiO_3$, BaO—$Al_2O_3$—$SiO_2$, Ba-ferrite, $SmCO_5$, $YCO_5$, $CeCO_5$, $PrCO_5$, $Sm_2CO_{17}$, $Nd_2Fe_{14}B$, $Al_4O_3$, α-Si, $SiN_4$, CoO, Sb—$SnO_2$, $Sb_2O_5$, $MnO_2$, MnB, $Co_3O_4$, $CO_3B$, $LiTaO_3$, MgO, $MgAl_2O_4$, $BeAl_2O_4$, $ZrSiO_4$, ZnSb, PbTe, GeSi, $FeSi_2$, $CrSi_2$, $CoSi_2$, $MnSi_{1.73}$, $Mg_2Si$, β-B, BaC, BP, $TiB_2$, $ZrB_2$, $HfB_2$, $Ru_2Si_3$, $TiO_3$, $PbTiO_3$, $Al_2TiO_5$, $Zn_2SiO_4$, $Zr_2SiO_4$, $2MgO_2$—$Al_2O_3$-$5SiO_2$, $Nb_2O_5$, $Li_2O$—$Al_2O_3$-$4SiO_2$, Mg-ferrite, Ni-ferrite, Ni—Zn-ferrite, Li-ferrite, Sr-ferrite, and the like. These inorganic compounds may be used alone or as a mixture of two or more.

As mentioned above, inorganic filler (C) may be used in a form such as powder, aqueous sol or colloid, in which the inorganic compound is dispersed in water, or solvent-based sol or colloid, in which the inorganic compound is dispersed in a polar solvent such as isopropyl alcohol or a nonpolar solvent such as toluene. When inorganic filler (C) is used in a form of solvent-based sol or solvent-based colloid, it may be further diluted with water or a solvent depending on the dispersibility of inorganic compound, or surface treatment may be preformed to improve the dispersibility.

The average particle diameter of inorganic filler (C) is typically 0.005 to 1 μm, more preferably 0.01 to 0.5 μm, and especially preferably 0.01 to 0.2 μm.

When inorganic filler (C) is used in a form of aqueous sol, aqueous colloid, solvent-based sol, or solvent-based colloid, the concentration of the solid content is typically more than 0% by weight and not more than 50% by weight, and preferably not less than 0.01% by weight and not more than 40% by weight.

In the present invention, colloidal silica and colloidal alumina are particularly preferably used as inorganic filler (C). The colloidal silica includes colloidal silica dispersed in an organic solvent, such as colloidal silica dispersed in methanol, colloidal silica dispersed in isopropanol, colloidal silica dispersed in methyl isobutyl ketone, and colloidal silica dispersed in toluene. The colloidal alumina includes alumina dispersed in water.

Inorganic filler (C) may be added either during preparing organic-inorganic hybrid polymer (A) or after mixing organic-inorganic hybrid polymer (A) and polysiloxane (B).

The amount of inorganic filler (C) is typically more than 0% by weight and not more than 90% by weight, and preferably not less than 5% by weight and not more than 80% by weight, in terms of the solid content, with respect to the whole solid content of the coating composition. If the amount of inorganic filler (C) exceeds the upper limit, the storage stability or film-forming property may be deteriorated.

(D) Ultraviolet Absorber/Ultraviolet Stabilizer

Ultraviolet absorber (D1) or ultraviolet stabilizer (D2) may be blended in the coating composition of the present invention in order to prevent an organic substrate from ultraviolet degradation and to improve long-term weatherability and adhesion durability.

Ultraviolet absorber (D1) includes inorganic semiconductors such as $ZnO_2$, $TiO_2$ having no photocatalytic activity, and $CeO_2$; and organic ultraviolet absorbers such as salicylic acid-based ultraviolet absorbers, benzophenone-based ultraviolet absorbers, benzotriazole-based ultraviolet absorbers, cyanoacrylate-based ultraviolet absorbers, and triazine-based ultraviolet absorbers. Ultraviolet stabilizer (D2) includes piperidine-based ultraviolet stabilizers and the like.

Particularly, when colloidal silica is used as inorganic filler (C), an inorganic semiconductor-type ultraviolet absorber is preferably used in order to prevent a coating film from bleeding and deteriorating.

Ultraviolet absorber (D1) and ultraviolet stabilizer (D2) each is used in an amount of 1 to 90% by weight and preferably 5 to 80% by weight, in terms of the solid content, with respect to the whole solid content of the coating composition.

(E) Organic Solvent

In the present invention, organic solvent (E) maybe added in order to adjust the concentration of the whole solid content of the coating composition. The addition of organic solvent (E) can further improve the dispersion stability and storage stability of the resultant coating composition.

Organic solvent (E) includes alcohols, aromatic hydrocarbons, ethers, ketones, and esters, which are listed as the organic solvent used in producing the specific silyl group-containing polymer (b). These organic solvents may be used alone or as a mixture of two or more.

Organic solvent (E) is used in such an amount that the concentration of the whole solid content of coating composition is typically more than 0% by weight and not more than 50% by weight, and preferably not less than 0.01% by weight and not more than 40% by weight. When the amount of organic solvent (E) is within the above range, a coating composition having excellent dispersion stability and storage stability can be obtained, and the coating workability of the coating composition is also excellent.

(F) Catalyst

In forming a coating film, it is preferred to add catalyst (F) to the coating composition of the present invention in order to further accelerate the hydrolysis and condensation of the organic-inorganic hybrid polymer (A) and the polysiloxane (B) When catalyst (F) is used, the curing rate of the coating film increases. In addition, the molecular weight of polysiloxane resin formed by the hydrolysis and condensation increases, whereby a coating film having excellent strength and long-term durability can be obtained.

As a catalyst (F), a catalyst like the catalyst (c) may be used.

When the catalyst (F) is not an organometal-based compound, the amount of catalyst (F) used is typically 0.001 to 100 parts by weight, preferably 0.01 to 80 parts by weight, and more preferably 0.1 to 50 parts by weight, with respect to 100 parts by weight of the total amount of organic-inorganic hybrid polymer (A) and polysiloxane (B). When the catalyst (F) is an organometal-based compound, the amount is typically not more than 100 parts by weight, preferably 0.1 to 80 parts by weight, and more preferably 0.5 to 50 parts by weight, with respect to 100 parts by weight of the total amount of organic-inorganic hybrid polymer (A) and polysiloxane (B). If catalyst (F) is used in an amount over the upper limit, the stability of the composition is sometimes deteriorated during forming a coating film or cracking sometimes occurs in the coating film.

(Other Additives)

In the coating composition of the present invention, besides inorganic filler (C), another filler may be added and dispersed to obtain a colored coating film or a thick coating film. Such fillers include, for example, water-insoluble organic pigments or inorganic pigments; ceramics, metals, alloys, oxides of metal or alloy, hydroxides of metal or alloy, carbides of metal or alloy, nitrides of metal or alloy, sulfides of metal or alloy, and the like, which are used in a particulate, fibrous or scale form, but not pigments.

The other fillers include iron, copper, aluminum, nickel, silver, zinc, ferrite, carbon black, stainless steel, silica, titanium oxide for pigments, alumina, chromium oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, viridian, Guignet's green, cobalt chrome green, shale green, green soil, manganese green, pigment green, ultramarine blue, iron blue, azurite, cobalt blue, cerulean blue, copper borate, molybdenum blue, copper sulfide, cobalt violet, mars violet, manganese violet, pigment violet, lead suboxide, calcium plumbate, zinc yellow, lead sulfide, chrome yellow, yellow soil, cadmium yellow, strontium yellow, titanium yellow, litharge, pigment yellow, cuprous oxide, cadmium red, selenium red, chrome vermilion, red iron oxide, zinc white, antimony white, basic lead sulfate, titanium white, lithopone, lead silicate, zirconium oxide, tungsten white, lead, zinc oxide, Bantison white, lead phthalate, manganese white, lead sulfate, graphite, bone black, diamond black, Thermatomic black, vegetable black, potassium titanate whisker, molybdenum disulfide, and the like.

These other fillers may be used alone or as a mixture of two or more. The amount of the other filler is typically not more than 300 parts by weight with respect to 100 parts by weight of the whole solid content of coating composition.

In the coating composition of the present invention, another additive may be blended as necessary. Such additives include publicly-known dehydrating agents such as methyl orthoformate, methyl orthoacetate, and tetraethoxysilane; dispersants such as polyoxyethylene alkyl ether, polyoxyethylene alkylphenyl ether, polyoxyethylene fatty acid ester, polycarboxylic acid-based polymer surfactant, polycarboxylate, polyphosphate, polyacrylate, polyamide ester salt, and polyethylene glycol; thickeners such as celluloses including methylcellulose, ethylcellulose, hydroxyethylcellulose, hydroxypropylcellulose, hydroxypropylmethylcellulose and the like, castor oil derivatives, and ferrosilicates; inorganic foaming agents such as ammonium carbonate, ammonium hydrogencarbonate, ammonium nitrite, sodium borohydride, and calcium azide; organic foaming agents such as azo compounds including azobisisobutyronitrile and the like, hydrazines including diphenylsulfone-3,3'-disulfohydrazine and the like, semicarbazides, triazoles, and N-nitroso compounds; surfactants, silane coupling agents, titanium coupling agents, dyes, and the like.

In the coating composition of the present invention, a leveling agent may be also blended in order to improve coating workability thereof. Among such leveling agents, as a fluorine-containing leveling agent, there may be mentioned, for example, commercially available products such as BM1000 and BM1100 (trade name, hereinafter the same) manufactured by BM-Chemie GmbH; Efca 772 and Efca 777 manufactured by Efca Chemicals; Floren series manufactured by Kyoeisha Chemical Co., Ltd.; FC series manufactured by Sumitomo 3M Ltd.; and Fluonal TF series manufactured by Toho Chemical Industry Co., Ltd. As a silicone-based leveling agent, there may be mentioned, for example, BYK series manufactured by BYK-Chemie GmbH; Sshmego series manufactured by Sshmegmann; and Efca 30, Efca 31, Efca 34, Efca 35, Efca 36, Efca 39, Efca 83, Efca 86, and Efca 88 manufactured by Efca Chemicals. As an ether- or ester-based leveling agent, there may be mentioned, for example, Carphynol manufactured by Nisshin Chemical Industry Co., Ltd.; Emergen and Homogenol manufactured by Kao Corporation; and the like.

When such a leveling agent is blended, the finishing appearance of a coating film is improved and the coating composition can be uniformly applied in forming thin films. The amount of the leveling agent is preferably 0.01 to 5% by weight, and more preferably 0.02 to 3% by weight, with respect to the whole solid content of coating composition.

The leveling agent may be blended to the composition during preparing the coating composition, just before forming a coating film, or both during preparing the composition and just before the film formation.

In the coating composition of the present invention, there may be further blended another resin such as acrylic urethane resin, epoxy resin, polyester, acrylic resin, fluororesin, acrylic resin emulsion, epoxy resin emulsion, polyurethane emulsion, and polyester emulsion.

<Preparation Method of Coating Composition>

The coating composition of the present invention can be prepared by mixing the organic-inorganic hybrid polymer (A) and the polysiloxane (B). The organic-inorganic hybrid polymer (A) may be used in a solution state. The coating composition may be applied as it is or may be applied after precondensation of organic-inorganic hybrid polymer (A) and polysiloxane (B)

In order to adjust the concentration of the whole solid content of the coating composition, organic solvent (E) may be added. Moreover, an additive such as inorganic filler (C), ultraviolet absorber (D1), ultraviolet stabilizer (D2), and catalyst (F) may be added where necessary.

The concentration of the whole solid content of the coating composition prepared as mentioned above is typically more than 0% by weight and not more than 50% by weight, and preferably not less than 0.01% by weight and not more than 40% by weight. The concentration of the whole solid content may be adjusted as appropriate depending on the type of a substrate, the application method, the thickness of coating film, and the like.

The coating composition of the present invention can provide coating films excellent in transparency and adhesion to organic substrates, owing to the combined use of organic-inorganic hybrid polymer (A) and polysiloxane (B).

The coating composition of the present invention may be also used as an undercoating composition for a photocatalytic layer. An intermediate layer formed by using this undercoating composition is excellent in transparency, adhesion to organic substrates or photocatalytic layers, resistance to radicals generated from photocatalytic layer, and long-term weatherability.

Layered Product

The first layered product of the present invention can be produced by applying the above coating composition to a surface of an organic substrate and drying. In order to form a coating film having a desired thickness, the coating composition may be optionally diluted with a solvent such as an organic solvent and water prior to the film formation.

In this layered product, the adhesion between the organic substrate and the coating film is excellent.

The organic substrate includes a plastic molded product made of phenol resin, epoxy resin, acryl resin, polyester, polycarbonate, polyethylene, polypropylene, ABS resin (acrylonitrile-butadiene-styrene resin), fluororesin, thermoplastic norbornene-based resin or the like, or a mixture thereof;

a plastic film and a plastic sheet made of polyethylene, polypropylene, polyvinyl alcohol, polycarbonate, polyethylene terephthalate, polyurethane, polyimide, polyacrylate, polyvinyl chloride, polyvinyl fluoride, fluororesin, thermoplastic norbornene-based resin, or the like, or a mixture thereof;

wood, paper, unwoven cloth, and the like.

These substrates may be subjected to a surface treatment in advance for the purpose of surface preparation, adhesion improvement, filling for a porous substrate, smoothing, patterning, and the like.

The surface treatment for the plastic substrate includes blast treatment, chemical treatment, degreasing, flaming treatment, oxidation treatment, vapor treatment, corona discharge treatment, ultraviolet irradiation treatment, plasma treatment, ion treatment, and the like.

The surface treatment for the wooden substrate includes grinding, filling, moth-proofing, and the like.

The surface treatment for the paper-made substrate includes filling, moth-proofing, and the like.

Further, various primers may be applied in advance. The type of primer, which is not specifically limited unless it inhibits the adhesion of the coating film, may be selected as appropriate depending on the type of organic substrate and the purpose of use. The primer may be used alone or as a mixture of two or more. The primer may be an enamel containing a coloring component such as a pigment or may be a clear paint without such coloring component.

The primer includes, for example, alkyd resin, aminoalkyd resin, epoxy resin, polyester, acrylic resin, urethane resin, fluororesin, acrylic silicone resin, acrylic resin emulsion, epoxy resin emulsion, polyurethane resin emulsion, polyester emulsion, and the like. When the adhesion between the organic substrate and the coating film is required under severe conditions, the primer may have various functional groups. Such a functional group includes, for example, hydroxyl, carboxyl, carbonyl, amido, amino, glycidyl, alkoxysilyl, ether bond, ester bond, and the like. Further, the primer may contain an ultraviolet absorber, an ultraviolet stabilizer, or the like.

As a method for applying the coating composition, there may be mentioned, for example, coating using a brush, a roll coater, a bar coater, a flow coater, a centrifugal coater, an ultrasonic coater, a (micro)gravure coater, or the like; dip-coating; flow-coating; spraying; screen processing; electrodeposition; vapor deposition; and the like.

A stable coating film can be obtained by forming a coating film by these methods and then by drying at ordinary temperature or at a temperature of about 30 to 200° C. for typically 1 to 60 minutes.

When a coating film is formed using the coating composition, there can be formed a film having a dried film thickness of about 0.05 to 20 μm in the case of single coating or a dried film thickness of about 0.01 to 40 μm in the case of double coating.

The second layered product of the present invention can be produced by a method in which the coating composition (undercoating composition) is applied onto a surface of an organic substrate and dried to form an intermediate layer and subsequently a photocatalyst-containing composition is applied onto the intermediate layer and dried to form a photocatalytic layer. In order to form an intermediate layer or a photocatalytic layer having a desired film thickness, the coating composition or the photocatalyst-containing composition may be appropriately diluted with a solvent such as an organic solvent and water prior to the film formation.

(Photocatalyst-Containing Composition)

The photocatalyst-containing composition is not specifically limited if it is a coating composition containing a photocatalyst. It includes, for example, photocatalyst-containing coating compositions described in Japanese Patent Laid-open Publication No. H8-164334, Japanese Patent Laid-open Publication No. H8-176527, and Japanese Patent Laid-open Publication No. H8-259891.

The photocatalyst-containing composition specifically includes a composition containing silane compound (a) used in the present invention and a photocatalyst, and a composition in which the specific silyl group-containing polymer (b) is further added to this composition. In the coating films obtained from these compositions, the photocatalyst is typically bonded to silane compound (a) or specific silyl group-containing polymer (b), whereby the hydrophilicity and the contamination resistance of the coating film are maintained for a long time.

These compositions may contain an inorganic filler, an ultraviolet absorber, an ultraviolet stabilizer, a stability improver, or the like. As these additives, there may be used additives like inorganic filler (C), ultraviolet absorber (D1), ultraviolet stabilizer (D2), and stability improver (f), respectively.

The photocatalyst includes semiconductors having photocatalytic activity such as $TiO_2$, $TiO_3$, $SrTiO_3$, $FeTiO_3$, $WO_3$, $SnO_2$, $Bi_2O_3$, $In_2O_3$, $ZnO$, $Fe_2O_3$, $RuO_2$, $CdO$, $CdS$, $CdSe$, $GaP$, $GaAs$, $CdFeO_3$, $MoS_2$, $LaRhO_3$, $GaN$, $CdP$, $ZnS$, $ZnSe$, $ZnTe$, $Nb_2O_5$, $ZrO_2$, $InP$, $GaAsP$, $InGaAlP$, $AlGaAs$, $PbS$, $InAs$, $PbSe$, and $InSb$. Among these, $TiO_2$ and $ZnO$ are preferred, and anatase-type $TiO_2$ is especially preferred.

These photocatalysts may be used alone or as a mixture of two or more.

These photocatalysts are desirable to use in a powder form and/or a sol form. Specifically, they are desirably used in at least one form among powder, aqueous sol in which the photocatalyst is dispersed in water, and a solvent-based sol in which the photocatalyst is dispersed in a polar solvent such as isopropyl alcohol or a nonpolar solvent such as toluene. The solvent-based sol may be further diluted with water or a solvent prior to use thereof depending on the dispersibility of the semiconductor.

It is preferred that the average particle diameter of the photocatalyst in such a form is as small as possible in terms of the photocatalytic activity. Particularly, if the average particle diameter is not less than 0.3 μm, the coating film becomes opaque due to the light masking effect of the photocatalyst, and therefore the average particle diameter is preferably less than 0.3 μm in order to obtain a transparent coating film. Thus, it is preferable that the average particle diameter is selected according to the applications of the coating film.

When the photocatalyst is used in an aqueous or solvent-based sol form for the photocatalyst-containing coating composition, the concentration of the solid content is preferably more than 0% by weight and not more than 50% by weight, and more preferably not less than 0.01% by weight and not more than 40% by weight.

After a mixture containing silane compound (a) and optionally specific silyl group-containing polymer (b) is prepared, the photocatalyst may be added to the mixture, but preferably it is simultaneously added during preparing this mixture. When the photocatalyst is added during preparing the mixture, the photocatalyst can be cocondensed with silane compound (a) or specific silyl group-containing polymer (b), and hence the long-term durability of the resultant coating film is particularly improved. Particularly, when the photocatalyst is aqueous sol, it is preferred to add during preparing the mixture. Further, when the viscosity of the composition is increased by adding a stability improver, the photocatalyst is preferably added during preparing the mixture.

When the photocatalyst-containing coating composition is used for enamel containing a coloring component, toning may be performed after adding the photocatalyst to the mixture, or the photocatalyst and the coloring component may be concurrently added to the mixture.

The amount of the photocatalyst contained in the photocatalytic layer formed from the photocatalyst-containing coating composition is typically 10 to 90% by weight, and preferably 20 to 80% by weight, in terms of the solid content with respect to the whole solid content in the photocatalytic layer. If the photocatalyst content is less than the lower limit, the effects of decomposing organic compounds and exerting hydrophilicity through photocatalytic action may be insufficient. If the photocatalyst content exceeds the upper limit, the film formability is sometimes deteriorated.

The concentration of the whole solid content of the photocatalyst-containing coating composition is preferably more than 0% by weight and not more than 50% by weight, and it may be adjusted by adding an organic solvent or the like according to the intended use. For example, the concentration is typically 0.1 to 10% by weight for forming thin films, and it is typically more than 0% by weight and not more than 50% by weight and preferably 10 to 30% by weight for forming thick films. If the concentration exceeds 50% by weight, the storage stability of the photocatalyst-containing coating composition tends to decrease.

(Organic Substrate)

As the organic substrate, there may be used organic substrates like those listed for the first layered product. As the case of the first layered product, the surface of the organic substrate may be pretreated.

As a method for applying and drying the coating composition and the photocatalyst-containing composition, there may be employed methods like the methods for applying and drying listed for the first layered product.

When an intermediate layer and a photocatalytic layer are formed by the above method, there can be formed the intermediate layer and the photocatalytic layer each having a dried film thickness of about 0.05 to 20 μm in the case of single coating or about 0.01 to 40 μm in the case of double coating.

The total thickness of the intermediate layer and the photocatalytic layer thus formed on the organic substrate is typically 0.1 to 80 μm and preferably 0.2 to 60 μm in terms of a dried film thickness.

In the first and second layered products of the present invention, the coating film or the intermediate layer formed from the coating composition and the photocatalytic layer may be formed as so-called gradient material, in which their composition continuously changes in the direction of thickness.

The gradient material can be formed, for example, (1) by a method in which the coating composition or the photocatalyst-containing composition is applied to form multiple layers, the composition being gradually changed layer by layer, or (2) by a method in which the coating composition or the photocatalyst-containing composition is applied to an organic substrate by a spin-coating or another method, and the coated organic substrate is placed parallel to the ground or reversed 180 degree and kept for a certain period so that, for example, inorganic filler (C) precipitates in the direction of gravity.

The second layered product of the present invention is not specifically limited as long as the organic substrate, the intermediate layer, and the photocatalytic layer are multiply layered in this order as described above. For example, when the organic substrate is a film having a film thickness of not more than 1000 μm, the second layered product is useful as a photocatalytic coating film. Such photocatalytic coating film may be attached to the surface of various molded products in use. The molded products include molded products made of organic material, such as organic resin plates, organic resin boards, lighting covers, fixtures, and wallpaper; and molded products made of inorganic material such as electric bulbs, glass, and mirrors.

The layered product of the present invention may be a layered product in which the intermediate layer and the photocatalytic layer are multiply layered in this order on an organic substrate that is a molded product. The molded product used in this case includes molded products made of organic material, such as organic resin plates, organic resin boards, lighting covers, fixtures, and wallpaper.

EXAMPLES

Hereinafter, the present invention will be described with reference to Examples, but the present invention is not limited to these examples. In Examples and Comparative Examples, "parts" and "%" represent "parts by weight" and "% by weight", respectively unless otherwise specified. In Examples and Comparative Examples properties are measured and evaluated by the following methods.

(1) Storage Stability

After a liquid coating composition was stored at 40° C. for 3 months, the appearance of the liquid was visually observed to rate on the following scale. For the sample rated at "A", the viscosity was measured with a Bookfield viscometer before and after the three-month storage, and the ratio of the viscosity increase after the three-month storage to the viscosity before the storage was calculated and rated on the following scale.

(Ratings for Appearance)

A: No change is observed compared to the initial state.

C: Gelation, separation, or precipitation is observed.

(Ratings for Viscosity)

AA: The ratio of viscosity increase is less than 10%.

A: The ratio of viscosity increase is not less than 10% and less than 20%.

B: The ratio of viscosity increase is not less than 20% and less than 100%.

C: The ratio of viscosity increase is not less than 100%.

(2) Transparency

The coating composition was applied onto a quartz glass plate so that the dried film thickness amounted 2 μm, and then a coating film was dried at 80° C. for 30 minutes. The whole light transmission was measured for the resultant coating film to rate the transparency on the following scale.

A: The light transmission is over 80%.

B: The light transmission is 60 to 80%.

C: The light transmission is less than 60%.

(3) Adhesion in Warm Water

A solution was prepared by adding 5 parts of i-butyl alcohol solution containing dioctyltin dimaleate (the concentration of the solid content: approximately 10%) to 100 parts of a coating composition, followed by sufficiently stirring. The solution was applied onto an acrylic plate (trade name: Acrylite #001, manufactured by Engineering Test Service) so that the dried film thickness amounted 2 μm, and then a coating film was dried at 80° C. for 30 minutes to form a cured film. The resultant sample was immersed in warm water at 60° C. for a predetermined period, and then tape-peel test was performed using cellophane tape (trade name: Cellotape (registered trademark) No. 405) manufactured by Nichiban Co., Ltd. to rate the adhesion on the following scale.

AA: The cured film is not peeled off after 1-week immersion.

A: The cured film is not peeled off after 4-day immersion, but peeled off after 1-week immersion.

B: The cured film is not peeled off after 1-day immersion, but peeled off after 4-day immersion.

C: The cured film is peeled off after 1-day immersion.

(4) Hydrophilicity

The cured film was irradiated with a blacklight fluorescent lamp with irradiance of 1.0 mW/cm$^2$ for one week, and then the contact angle of water (unit: degree) was measured.

(5) Weatherability

For the cured film, an exposure test was performed with a sunshine weatherometer for 3,000 hours in accordance with JIS K5400. Then, the appearance of the exposed film was visually observed to rate on the following scale, and the tape-peel test was also performed using cellophane tape (trade name: Cellotape (registered trademark) No. 405) manufactured by Nichiban Co., Ltd. to rate the adhesion on the following scale.

(Appearance)

A: Film is not peeled off and no change is observed compared to the appearance before the exposure test.

C: Film is peeled off.

(Adhesion)

AA: Film is not peeled off in any part of the whole tape-attached portion.

A: Film is peeled off at area less than 5% of the tape-attached portion.

B: Film is peeled off at area of 5 to 50% of the tape-attached portion.

C: Film is peeled off at area over 50% of the tape-attached portion.

[Preparation of Specific Silyl Group-Containing Polymer (b)]

Preparation Example 1

To a reactor equipped with a reflux condenser and a stirrer, there were charged 75 parts of methyl methacrylate, 5 parts of ethylhexyl acrylate, 5 parts of cyclohexyl methacrylate, 10 parts of γ-methacryloxypropyltrimethoxysilane, 5 parts of 4-(meth)acryloyloxy-2,2,6,6-tetramethylpiperidine, 75 parts of i-butyl alcohol, 50 parts of methyl ethyl ketone, and 25 parts of methanol, and the content was mixed and then heated to 80° C. with stirring. To this mixture, a solution prepared by dissolving 3 parts of azobisisovaleronitrile in 8 parts of xylene was added dropwise over 30 minutes, and the resultant mixture was allowed to react at 80° C. for 5 hours. After cooling, 35 parts of methyl ethyl ketone was added to the reaction mixture to obtain a solution containing specific silyl group-containing polymer (b-1) and having a concentration of solid content of 35%. The polymer (b-1) had an Mw, as measured by GPC, of 8,000 and a silicon content in the solid content of 1.1% by weight.

Preparation Example 2

A solution containing specific silyl group-containing polymer (b-2) and having a concentration of solid content of 35% was obtained in the same manner as in Preparation Example 1, except that 75 parts of methyl methacrylate was replaced with 55 parts of methyl methacrylate and 20 parts of glycidyl methacrylate. The polymer (b-2) had an Mw of 6,000 and a silicon content in the solid content of 1.1% by weight.

Preparation Example 3

A solution containing specific silyl group-containing polymer (b-3) and having a concentration of solid content of 35% was obtained in the same manner as in Preparation Example 1, except that 2-ethylhexyl acrylate was not added, the amount of methyl methacrylate was changed from 75 parts to 50 parts, and the amount of γ-methacryloxypropyltrimethoxysilane was changed from 10 parts to 40 parts. The polymer (b-3) had an Mw of 6,000 and a silicon content in the solid content of 4.5% by weight.

Example 1

To a reactor equipped with a reflux condenser and a stirrer, there were charged 13.5 parts of methyltrimethoxysilane and 5.4 parts of dimethyldimethoxysilane as silane compound (a), 257.1 parts of the specific silyl group-containing polymer (b-1) as specific silyl group-containing polymer (b), 2 parts of i-propyl alcohol as organic solvent (e), and 2 parts of 75%-diluted solution of di-i-propoxy(ethylacetoacetato) aluminum in i-propyl alcohol as catalyst (c) for hydrolysis and condensation. The content was mixed and then heated to 50° C. with stirring. To this mixture, water (d) was added dropwise over 30 minutes in an amount of 3.5 parts (corresponding to 0.5 mol per mol of all $OR^2$-groups in silane compound (a)), and the reaction was performed at 60° C. for 4 hours to obtain a solution containing organic-inorganic hybrid polymer (A-1). Subsequently, 1.5 parts of acetylacetone was added to the solution as stability improver (f), and after stirred for one hour, the solution was cooled to room temperature.

To the solution containing organic-inorganic hybrid polymer (A-1) were added 124.7 parts of polyorganosiloxane (trade name: YR3370, Mw: 8,000) manufactured by GE Toshiba Silicones Co., Ltd. as polysiloxane (B) and 1285 parts of methyl isobutyl ketone and 551 parts of i-propyl alcohol as solvent (E) with stirring. Subsequently, to the solution were added 100 parts of colloidal silica dispersed in i-propyl alcohol (concentration of solid content: 10%) as inorganic filler (C) and 300 parts of methyl isobutyl ketone dispersion of cerium oxide (concentration of solid content: 10%) as ultraviolet absorber (D) to obtain coating composition (I-1) having a concentration of solid content of approximately 10%. For coating composition (I-1), the storage stability, transparency, and adhesion in warm water were evaluated by the above evaluation methods. The composition and results of evaluation are shown in Table 1.

Examples 2 to 9

Coating compositions (I-2) to (I-9) were prepared and the properties were evaluated in the same manner as in Example 1, except that the components were changed to the components shown in Table 1. The results are shown in Table 1 and Table 2.

TABLE 1

|  | Ex. 1 | Ex. 2 | Ex. 3 | Ex. 4 | Ex. 5 |
|---|---|---|---|---|---|
| Coating composition | I-1 | I-2 | I-3 | I-4 | I-5 |
| (A) Organic-inorganic hybrid polymer | A-1 | A-2 | A-3 | A-4 | A-5 |
| (a) Silane compound (parts) |  |  |  |  |  |
| Tetramethoxysilane | — | — | — | — | — |
| Methyltrimethoxysilane | 13.5 | 40.6 | 40.6 | 40.6 | 40.6 |
| Dimethyldimethoxysilane | 5.4 | 16.2 | 16.2 | 16.2 | 16.2 |
| (b) Specific silyl group-containing polymer (parts) |  |  |  |  |  |
| (b-1) (Conc. of solid content: 35%) | 257.1 | — | — | — | — |
| (b-2) (Conc. of solid content: 35%) | — | 200.0 | 200.0 | 200.0 | 200.0 |
| (b-3) (Conc. of solid content: 35%) | — | — | — | — | — |
| (c) Catalyst (parts) |  |  |  |  |  |
| Di-i-propoxy(ethylacetoacetato)aluminum (75%-dilution with i-propyl alcohol) | 2 | 4 | 4 | 4 | 4 |
| (d) Water (parts) | 3.5 | 9.4 | 9.4 | 9.4 | 9.4 |
| (Mol per all $OR^2$ in component (a)) | (0.50) | (0.45) | (0.45) | (0.45) | (0.45) |

TABLE 1-continued

|  | Ex. 1 | Ex. 2 | Ex. 3 | Ex. 4 | Ex. 5 |
|---|---|---|---|---|---|
| (e) Organic solvent (parts) | | | | | |
| Isopropyl alcohol | 2 | 15 | 15 | 15 | 15 |
| (f) Stability improver (parts) | | | | | |
| Acetylacetone | 1.5 | 3.5 | 3.5 | 3.5 | 3.5 |
| (B) Polysiloxane | | | | | |
| Polyorganosiloxane (YR3370) (Mw = 8000) | 124.7 | 40.5 | 75.9 | 134.9 | 252.9 |
| Polyorganosiloxane (Mw = 700) | — | — | — | — | — |
| (C) Inorganic filler (parts) | | | | | |
| Colloidal silica dispersed in IPA (Conc. of solid content: 10%) | 100 | — | 200 | — | — |
| (D1) Ultraviolet absorber (parts) | | | | | |
| MIBK dispersion of $CeO_2$ (Conc. of solid content: 10%) | 300 | — | — | 350 | — |
| (E) Organic solvent (parts) | | | | | |
| Methyl isobutyl ketone | 1285 | 538 | 976 | 1155 | 2390 |
| Isopropyl alcohol | 551 | 538 | 418 | 770 | 597 |
| Butyl cellosolve | — | — | — | — | — |
| Wa/Wb | 10/90 | 30/70 | 30/70 | 30/70 | 30/70 |
| (Wa + WB)/Wb | 60/40 | 50/50 | 60/40 | 70/30 | 80/20 |
| Storage stability  Liquid appearance | A | A | A | A | A |
|   Viscosity change | AA | AA | AA | AA | AA |
| Transparency | A | A | A | A | A |
| Adhesion in warm water | A | A | A | A | A |

TABLE 2

|  | Ex. 6 | Ex. 7 | Ex. 8 | Ex. 9 |
|---|---|---|---|---|
| Coating composition | I-6 | I-7 | I-8 | I-9 |
| (A) Organic-inorganic hybrid polymer | A-6 | A-7 | A-8 | A-9 |
| (a) Silane compound (parts) | | | | |
| Tetramethoxysilane | — | — | — | 45.6 |
| Methyltrimethoxysilane | 54.1 | 40.6 | 40.6 | 24.3 |
| Dimethyldimethoxysilane | 21.6 | 16.2 | 16.2 | — |
| (b) Specific silyl group-containing polymer (parts) | | | | |
| (b-1) (Conc. of solid content: 35%) | 171.4 | — | — | — |
| (b-2) (Conc. of solid content: 35%) | — | 200.0 | — | 200.0 |
| (b-3) (Conc. of solid content: 35%) | — | — | 200.0 | — |
| (c) Catalyst (parts) | | | | |
| Di-i-propoxy(ethylacetoacetato) aluminum (75%-dilution with i-propyl alcohol) | 5 | 4 | 4 | 4 |
| (d) Water (parts) | 12.6 | 23.0 | 9.4 | 12.5 |
| (Mol per all $OR^2$ in component (a)) | (0.40) | (1.10) | (0.45) | (0.40) |
| (e) Organic solvent (parts) | | | | |
| Isopropyl alcohol | 17 | — | 15 | — |
| (f) Stability improver (parts) | | | | |
| Acetylacetone | 4 | 3.5 | 3.5 | 3.5 |
| (B) Polysiloxane | | | | |
| Polyorganosiloxane (YR3370) (Mw = 8000) | 100.0 | 75.9 | 75.9 | 40.5 |
| Polyorganosiloxane (Mw = 700) | — | — | — | — |
| (C) Inorganic filler (parts) | | | | |
| Colloidal silica dispersed in IPA (Conc. of solid content: 10%) | — | — | — | — |
| (D1) Ultraviolet absorber (parts) | | | | |
| MIBK dispersion of $CeO_2$ (Conc. of solid content: 10%) | 300 | — | — | — |
| (E) Organic solvent (parts) | | | | |
| Methyl isobutyl ketone | 886 | 976 | 976 | 538 |
| Isopropyl alcohol | 646 | 419 | 418 | 534 |
| Butyl cellosolve | 83 | — | — | — |
| Wa/Wb | 40/60 | 30/70 | 30/70 | 30/70 |
| (Wa + WB)/Wb | 70/30 | 60/40 | 60/40 | 50/50 |
| Storage stability  Liquid appearance | A | A | A | A |
|   Viscosity change | AA | A | A | A |
| Transparency | A | A | A | A |
| Adhesion in warm water | A | A | A | A |

Comparative Examples 1 to 4

Coating compositions (i-1) to (i-4) were prepared and the physical properties were evaluated in the same manner as in Example 1, except that the components were changed to the components listed in Table 3. The results are shown in Table 3.

TABLE 3

|  | Comp. Ex. 1 | Comp. Ex. 2 | Comp. Ex. 3 | Comp. Ex. 4 |
|---|---|---|---|---|
| Coating composition | i-1 | i-2 | i-3 | i-4 |
| (A) Organic-inorganic hybrid polymer | | | | |
| (a) Silane compound (parts) | | | | |
| Tetramethoxysilane | — | — | — | — |

TABLE 3-continued

|  | Comp. Ex. 1 | Comp. Ex. 2 | Comp. Ex. 3 | Comp. Ex. 4 |
|---|---|---|---|---|
| Methyltrimethoxysilane | 71.0 | 40.6 | 13.5 | — |
| Dimethyldimethoxysilane | 24.3 | 16.2 | 5.4 | — |
| (b) Specific silyl group-containing polymer (parts) | | | | |
| (b-1) (Conc. of solid content: 35%) | — | — | 257.1 | 200.0 |
| (b-2) (Conc. of solid content: 35%) | 95.2 | 200.0 | — | — |
| (b-3) (Conc. of solid content: 35%) | — | — | — | — |
| (c) Catalyst (parts) | | | | |
| Di-i-propoxy(ethylacetoacetato) aluminum (75%-dilution with i-propyl alcohol) | | | | |
| (d) Water (parts) | 16.0 | 9.4 | 3.5 | — |
| (Mol per all $OR^2$ in component (a)) | (0.45) | (0.45) | (0.50) | — |
| (e) Organic solvent (parts) | | | | |
| Isopropyl alcohol | 10 | 15 | 2 | — |
| (f) Stability improver (parts) | | | | |
| Acetylacetone | 6 | 3.5 | 1.5 | — |
| (B) Polysiloxane | | | | |
| Polyorganosiloxane (YR3370) (Mw = 8000) | — | — | — | 70 |
| Polyorganosiloxane (Mw = 700) | — | 40.5 | — | — |
| (C) Inorganic filler (parts) | | | | |
| Colloidal silica dispersed in IPA (Conc. of solid content: 10%) | — | — | 100 | — |
| (D1) Ultraviolet absorber (parts) | | | | |
| MIBK dispersion of $CeO_2$ (Conc. of solid content: 10%) | — | — | 300 | — |
| (E) Organic solvent (parts) | | | | |
| Methyl isobutyl ketone | 302 | 538 | 359 | 565 |
| Isopropyl alcohol | 302 | 359 | 538 | 565 |
| Butyl cellosolve | — | — | — | — |
| Wa/Wb | 60/40 | 30/70 | 10/90 | 0/100 |
| (Wa + WB)/Wb | 60/40 | 50/50 | 10/90 | 50/50 |
| Storage stability — Liquid appearance | A | A | A | A |
| Storage stability — Viscosity change | AA | AA | AA | AA |
| Transparency | A | A | A | C |
| Adhesion in warm water | C | C | A | Not measured |

Examples 10 to 18

Each solution was prepared by adding 5 parts of i-butyl alcohol solution containing dioctyltin dimaleate (concentration of solid content: approximately 10%) to 100 parts of each of coating compositions (I-1) to (I-9), followed by sufficiently stirring. The solution was applied onto an acrylic plate (trade name: Acrylite #001, manufactured by Engineering Test Service) so that the dried film thickness amounted 1 μm, and then a coating film was dried at 80° C. for 30 minutes to form a cured film.

For these cured films, the weatherability was evaluated by the above evaluation methods. The results are shown in Table 4.

Comparative Example 5

A cured film was prepared and the weatherability was evaluated in the same manner as in Example 10, except that the coating composition (I-1) was replaced with the coating composition (i-3). The results are shown in Table 4.

TABLE 4

| | Coating composition | Weatherability Appearance | Weatherability Adhesion |
|---|---|---|---|
| Ex. 10 | I-1 | A | AA |
| Ex. 11 | I-2 | A | AA |
| Ex. 12 | I-3 | A | AA |
| Ex. 13 | I-4 | A | AA |
| Ex. 14 | I-5 | A | AA |
| Ex. 15 | I-6 | A | AA |
| Ex. 16 | I-7 | A | AA |
| Ex. 17 | I-8 | A | AA |
| Ex. 18 | I-9 | A | AA |
| Comp. Ex. 5 | i-3 | A | A |

Substrate: acrylic plate (trade name: Acrylite #001, manufactured by Engineering Test Service)

[Preparation of Coating Composition for Forming Photocatalytic Layer]

Preparation Example 4

To a reactor equipped with a reflux condenser and a stirrer, there were charged 157 parts of aqueous dispersion of titanium oxide having a concentration of solid content of approximately 24%, 8 parts of 3-glycidoxypropyltrimethoxysilane, 11 parts of terminal alkoxysilyl group/poly(oxyethylene/oxypropylene) group-containing dimethyldimethoxysilane oligomer (Mw: approximately 10,000), and 22 parts of i-propyl alcohol, and the content was stirred at room temperature for one hour. Thereafter, 60 parts of methyltrimethoxysilane and 23 parts of specific silyl group-containing polymer (b-2) were added to the mixture, and then the mixture was stirred at room temperature for one hour. Subsequently, addition of 36 parts of i-propyl alcohol to the resultant mixture was carried out, followed by stirring at 30° C. for one hour. Then, to the resultant mixture was added 20 parts of solution prepared by dissolving 2 parts of di-i-propoxy(ethylacetoacetato)aluminum in 18 parts of i-propyl alcohol, and they were mixed, and then the reaction was performed at 60° C. for 4 hours with stirring. After cooled to room temperature, 600 parts of i-propyl alcohol was added to the reaction solution to obtain a composition (X-1) for forming photocatalytic layer, the composition (X-1) having a concentration of solid content of approximately 10%.

Preparation Example 5

To a mixture containing 13 parts of aqueous dispersion of titanium oxide having a concentration of solid content of 30%, 6 parts of Ethyl silicate 48 manufactured by Colcoat Co., Ltd., and 30 parts of colloidal silica dispersed in i-propanol having a concentration solid content of approximately 10%, 51 parts of i-propanol were added to obtain composition for forming photocatalytic layer (X-2) having a solid content of approximately 10%.

Examples 19 to 30

A solution was prepared by adding 5 parts of i-butyl alcohol solution containing dioctyltin dimaleate (concentration of solid content: approximately 10%) to 100 parts of each of coating compositions (I-1) to (I-9), followed by sufficiently stirring. The solution was applied onto an acrylic plate (trade name: Acrylite #001, manufactured by Engineering Test Service) so that the dried film thickness amounted 1 μm, and then a coating film was dried at 80° C. for 30 minutes.

A solution was prepared by adding 3 parts of i-propyl alcohol solution containing dioctyltin diacetate (concentration of solid content: approximately 10%) to 100 parts of a composition for forming photocatalytic layer (X-1) or (X-2), as listed in Table 5, followed by sufficiently stirring. The solution was applied so that the dried film thickness amounted 0.1 μm, and then a coating film was dried at 80° C. for 30 minutes to form a cured film.

For the resultant cured films, the hydrophilicity and weatherability were evaluated by the above evaluation methods. The results are shown in Table 5.

Comparative Example 6

A cured film was prepared and the hydrophilicity and weatherability were evaluated in the same manner as in Example 19, except that the coating composition (I-1) was replaced with the coating composition (i-3). The results are shown in Table 5.

Comparative Example 7

A cured film was prepared and the hydrophilicity and weatherability were evaluated in the same manner as in Example 28, except that the coating composition (I-2) was replaced with the coating composition (i-3). The results are shown in Table 5.

TABLE 5

|  | Coating composition | Composition for forming photocatalytic layer | Hydrophilicity (deg) | Weatherability Appearance | Adhesion |
|---|---|---|---|---|---|
| Ex. 19 | I-1 | X-1 | 5 | A | A |
| Ex. 20 | I-2 |  | 6 | A | AA |
| Ex. 21 | I-3 |  | 5 | A | AA |
| Ex. 22 | I-4 |  | 5 | A | AA |
| Ex. 23 | I-5 |  | 6 | A | AA |
| Ex. 24 | I-6 |  | 6 | A | AA |
| Ex. 25 | I-7 |  | 5 | A | AA |
| Ex. 26 | I-8 |  | 5 | A | AA |
| Ex. 27 | I-9 |  | 5 | A | AA |
| Ex. 28 | I-2 | X-2 | 6 | A | AA |
| Ex. 29 | I-3 |  | 5 | A | AA |
| Ex. 30 | I-5 |  | 5 | A | AA |
| Comp Ex. 6 | i-3 | X-1 | 6 | C[1] | C[1] |
| Comp Ex. 7 | i-3 | X-2 | 6 | C[1] | C[1] |

Film was peeled between the photocatalytic layer and the intermediate layer.
Substrate: acrylic plate (trade name: Acrylite #001, manufactured by Engineering Test Service)

INDUSTRIAL APPLICABILITY

The present invention provides a coating film excellent in transparency, adhesion to organic substrates, and weatherability; and a layered product having the coating film. The invention also provides a layered product having a photocatalytic layer formed on the surface of an organic substrate, and having an intermediate layer excellent in transparency, adhesion to the organic substrate, and radical resistance. When such a layered product is in a film form, it can be attached to various molded products, such as lighting covers, fixtures, wallpaper, glass, and mirrors, to form molded products having photocatalytic activity. Further, when a molded product made of organic material, such as a light cover, fixtures, and wallpaper, is used as a substrate, the layered product can be used as a molded product having photocatalytic activity.

The invention claimed is:

1. A coating composition comprising at least one organic-inorganic hybrid polymer (A) and at least one polysiloxane (B),
   wherein said organic-inorganic hybrid polymer (A) is prepared by adding a catalyst (c) for accelerating hydrolysis and condensation and water (d) to a mixture of at least one silane compound (a) and a polymer (b),
   wherein said at least one silane compound (a) is selected from the group consisting of at least one organosilane represented by formula (1), a hydrolysate of said organosilane and a condensate of said organosilane:

$$R^1_n Si(OR^2)_{4-n} \quad (1)$$

wherein
   each $R^1$ group independently represents a monovalent organic group having 1 to 8 carbon atoms;
   each $R^2$ group independently represents an alkyl group having 1 to 5 carbon atoms or an acyl group having 1 to 6 carbon atoms; and
   n is an integer of 0 to 2,
   wherein said polymer (b) has a silyl group containing a silicon atom bonded to at least one of a hydrolysable group and a hydroxyl group, and
   wherein the weight ratio (Wa/Wb) of the content (Wa) of the silane compound (a) in said mixture in terms of the completely hydrolyzed condensate to the content (Wb) of the polymer (b) in said mixture in terms of the solid content is in the range from 5/95 to 50/50, provided that Wa+Wb=100;
   wherein said polysiloxane (B) has a weight-average molecular weight of 800 to 50,000 and is represented by average composition formula (2), $$R^3_a SiO_b(OH)_c(OR^4)_d(Y)_e \quad (2)$$

wherein
   each $R^3$ group independently represents an organic group having 1 to 8 carbon atoms;
   each $R^4$ group independently represents an organic group selected from the group consisting of an alkyl group having 1 to 6 carbon atoms, an acyl group having 1 to 6 carbon atoms, and a phenyl group;
   $R^3$ and $R^4$ are the same or different from each other;
   Y represents a halogen atom or a hydrogen atom; and a, b, c, d, and e each independently is not less than 0 and not more than 4 and they satisfy a+b/2+c+d+e=4.

2. The coating composition according to claim 1, wherein the weight ratio [(Wa+WB)/Wb] of the sum of the amount (Wa) of the silane compound (a) in terms of the completely hydrolyzed condensate and the amount (WB) of the polysiloxane (B) to the amount (Wb) of the polymer (b) in terms of the solid ranges from 40/60 to 95/5, provided that Wa+WB+Wb=100.

3. The coating composition according to claim 1, wherein water (d) is present in an amount of 0.1 to 1.0 mol per mol of all $OR^2$ groups in the silane compound (a).

4. The coating composition according to claim 1, wherein the content of the silyl group in the polymer (b), which contains a silicon atom bonded to at least one of a hydrolysable group and a hydroxyl group, is 0.1 to 2% by weight in terms of the silicon atom content.

5. The coating composition according to claim 1, wherein a in the average composition formula (2) is more than 0 and not more than 2.

6. A coating composition comprising a condensate of the organic-inorganic hybrid polymer (A) and the polysiloxane (B), which are contained in the coating composition according to claim 1.

7. The coating composition according to claim 1, further comprising at least one inorganic filler (C).

8. The coating composition according to claim 1, further comprising at least one of an ultraviolet absorber (D1) an ultraviolet stabilizer (D2).

9. A layered product comprising an organic substrate and a coating film formed on the organic substrate, wherein the coating film is obtained from the coating composition according to claim 1.

10. An undercoating composition for a photocatalytic layer, which is the coating composition according to claim 1.

11. A layered product comprising an organic substrate, an intermediate layer provided on the organic substrate, and a photocatalytic layer provided on the intermediate layer, wherein the intermediate layer is formed from the undercoating composition for a photocatalytic layer according to claim 10.

12. A photocatalytic coating film which is the layered product according to claim 11, wherein the thickness of the organic substrate is not more than 1000 μm.

13. A molded product having the photocatalytic coating film according to claim 12 on a surface thereof.

14. A molded product comprising the layered product according to claim 11.

15. The coating composition according to claim 1, wherein said at least one silane compound (a) comprises at least one silane compound represented by formula (I) where n is 1 and at least one silane compound represented by formula (I) where n is 2.

16. The coating composition according to claim 15, wherein said at least one silane compound represented by formula (I) where n is 1 is methyltriacetyloxysilane and said at least one silane compound represented by formula (I) where n is 2 is dimethyldiacetyloxysilane.

17. The coating composition according to claim 1, wherein said polymer (b) contains a silyl group represented by formula (3):

(3)

wherein
X is a hydrolysable group selected from the group consisting of a halogen atom, an alkoxy group, an acetoxy group, a phenoxy group, a thioalkoxy group, an amino group, and a hydroxyl group
$R^5$ is selected from the group consisting of a hydrogen atom, an alkyl group having 1 to 10 carbon atoms, and an aralkyl group having 1 to 10 carbon atoms; and
is an integer of 1 to 3.

* * * * *